US012807820B2

(12) United States Patent
Mackiewicz

(10) Patent No.: US 12,807,820 B2
(45) Date of Patent: Nov. 24, 2026

(54) PROTECTIVE COATINGS FOR METALS

(71) Applicant: MCT Holdings LTD, Tortola (VG)

(72) Inventor: Agnieszka Mackiewicz, London (GB)

(73) Assignee: MCT Holdings LTD, Tortola (VG)

( * ) Notice: Subject to any disclaimer, the term of this patent is extended or adjusted under 35 U.S.C. 154(b) by 732 days.

(21) Appl. No.: 17/782,589

(22) PCT Filed: Dec. 4, 2020

(86) PCT No.: PCT/EP2020/084732
§ 371 (c)(1),
(2) Date: Jun. 3, 2022

(87) PCT Pub. No.: WO2021/110964
PCT Pub. Date: Jun. 10, 2021

(65) Prior Publication Data

US 2023/0019472 A1 Jan. 19, 2023

(30) Foreign Application Priority Data

Dec. 5, 2019 (GB) ..................................... 1917790

(51) Int. Cl.
*C23C 22/50* (2006.01)
*C09D 1/02* (2006.01)
(Continued)

(52) U.S. Cl.
CPC ................. *C09D 1/02* (2013.01); *C09D 5/08* (2013.01); *C23C 22/50* (2013.01); *C23C 22/73* (2013.01); *C23C 22/78* (2013.01); *C23C 22/83* (2013.01)

(58) Field of Classification Search
CPC .......... C23C 22/50; C23C 22/73; C23C 22/78
See application file for complete search history.

(56) References Cited

U.S. PATENT DOCUMENTS 7,601,226 B2 10/2009 Voges et al.
8,062,095 B2 11/2011 Voges et al.
(Continued)

FOREIGN PATENT DOCUMENTS

CN 1754009 A 3/2006
GB 965837 A 8/1964
(Continued)

OTHER PUBLICATIONS

International Search Report and Written Opinion for Corresponding International Application No. PCT/EP2020/084732 mailing date Mar. 18, 2021.

(Continued)

*Primary Examiner* — Dah-Wei D. Yuan
*Assistant Examiner* — Kristen A Dagenais
(74) *Attorney, Agent, or Firm* — MARSHALL, GERSTEIN & BORUN LLP

(57) ABSTRACT

The present invention relates to metals or metal alloys comprising a protective silicate glass-like coating, and methods for coating the metals or metal alloys. The methods comprise removal of any existing oxide layer from the metal or metal alloy, formation of a new oxide layer on the metal or metal alloy using chemical passivation or exposure to a gaseous oxidising environment, coating the oxidised metal or metal alloy with an aqueous silicate solution, and curing the coating.

21 Claims, 6 Drawing Sheets

(51) Int. Cl.

| | |
|---|---|
| ***C09D 5/08*** | (2006.01) |
| ***C23C 22/73*** | (2006.01) |
| ***C23C 22/78*** | (2006.01) |
| ***C23C 22/83*** | (2006.01) |

(56) References Cited

U.S. PATENT DOCUMENTS

| | | | |
|---|---|---|---|
| 8,066,549 B2 | 11/2011 | Voges et al. | |
| 8,074,331 B2 | 12/2011 | Voges | |
| 8,128,460 B2 | 3/2012 | Voges et al. | |
| 8,707,529 B2 | 4/2014 | Voges | |
| 9,333,625 B1 | 5/2016 | Voges et al. | |
| 9,435,036 B2 * | 9/2016 | Jennings | C23C 28/04 |
| 2003/0079811 A1 * | 5/2003 | Carey, II | C23C 2/00344 148/527 |
| 2005/0181137 A1 | 8/2005 | Straus | |
| 2013/0099422 A1 * | 4/2013 | Ritzenhoff | C25D 11/246 264/400 |
| 2014/0034115 A1 | 2/2014 | Sato et al. | |
| 2018/0305825 A1 * | 10/2018 | Alkhaldi | C23F 11/04 |

FOREIGN PATENT DOCUMENTS

| | | | |
|---|---|---|---|
| GB | 979755 | A | 1/1965 |
| JP | S61210185 | A | 9/1986 |
| JP | 2013084879 | A | 5/2013 |
| WO | WO-2009/068168 | A1 | 6/2009 |
| WO | WO-2009/117379 | A1 | 9/2009 |
| WO | WO-2016/039809 | A1 | 3/2016 |

OTHER PUBLICATIONS

International Preliminary Report on Patentability for Corresponding International Application No. PCT/EP2020/084732, mailing date Feb. 4, 2022.

Intellectual Property Office Search Report for Corresponding Application No. GB 1917790.6 dated Dec. 6, 2021.

Article 19 Amendments and Response to the International Search Report and Written Opinion for Corresponding International Application No. PCT/EP2020/084732 dated Sep. 28, 2021.

* cited by examiner

PROTECTIVE COATINGS FOR METALS

CROSS REFERENCE TO RELATED APPLICATIONS

This Application is a U.S. National Stage of International Patent Application No. PCT/EP2020/084732 filed Dec. 4, 2020, which claims the benefit of priority GB 1917790.6 filed Dec. 5, 2019, the respective disclosures of which are each incorporated herein by reference in their entireties.

FIELD OF THE INVENTION

The herein disclosed invention is directed to protective inorganic coatings for coated metals having improved properties and methods for their preparation.

BACKGROUND

Passivation is an example of a general class of conversion coatings, in which the metal surface is converted into the coating by means of a chemical or electrochemical process. The present invention is designed to be used in conjunction with a passive coating.

The process of formation of an oxide layer on titanium/titanium alloys and stainless steel is a well-known and widely used industrial procedure to produce protective and/or decorative coatings on titanium and/or titanium alloys and/or stainless steel. A passive layer on metal titanium is mostly composed of titanium dioxide, while a passive layer on stainless steel is mostly chromium(III) oxide, which may also be considered as a chromium oxide. For brevity, references to "chromium oxide" herein include "chromium(III) oxide", unless the context indicates otherwise.

On many other metals the oxide forms as a tightly adhering layer, increasing the corrosion resistance and wear resistance, and providing a better substrate for adhesion of secondary layers such as paints, primers, and glues than does the bare metal.

The oxide layer, which protects the base metal from corrosion, can be obtained generally in two ways. The first process is known as passivation. This process occurs naturally when many metals are in contact with an oxidising environment. Natural oxides that are allowed to develop on their own over a long period of time and/or without controlled parameters are typically rough, irregular, and not continuous. A better surface structure can be obtained in the technological process of removal of the naturally existing oxide layer by chemical or by mechanical means (for example, by pickling or mechanical treatment such as abrasive blasting) and passivation under controlled conditions, which gives a more uniform oxide layer.

Another way to create a protective oxide layer is anodisation (or anodization, also called anodising/anodizing). Anodisation is an electrolytic passivation process used to increase the thickness of the natural oxide layer on the surface of the metal. The electrochemical formation of oxide layers on metals is a well-known and widely used industrial procedure. Many different processes of anodising are known. For example, titanium/titanium alloy/stainless steel materials can be anodised in electrolytes, such as sulphuric acid, chromic acid, phosphoric acid, oxalic acid and any other electrolytes, by the application of AC or DC currents (also plasma electrolytic oxidation) in a bath at a wide range of temperatures. Variations in this treatment can change the thickness and colour of the oxide layer. The created oxide layer is transparent but as a result of thin-film interference, a colour effect can be obtained and the colour depends on the oxide film thickness.

For titanium/titanium alloys/stainless steel, passivation is a natural creation of amorphous oxide layer with a thickness of several nanometres, whereas anodisation can change the microscopic texture of the surface and can change the crystal structure of the metal near the surface and give a crystalline structure of titanium dioxide.

Anodising and passivation are effective methods of generating a thin, hard, protective coating on metals such as titanium, titanium alloys, stainless steel, and other metals. The resulting coatings are all porous to some degree, which improves the adhesion of secondary coatings such as paints. Presently available coating treatments are not entirely satisfactory in terms of effectiveness at preventing corrosion, stain resistance, heat resistance, UV resistance, environmental impact and cost. Equally, passive titanium/titanium alloy/stainless steel, even with presently available coating treatments, shows susceptibility to further oxidation at high temperatures, which results in a change of surface colour, which usually is not desired.

WO2009/117379 and WO2016/039809 describe methods of applying protective coatings for metals, including an anodised layer.

There is a need for an alternative means of coating or otherwise improving high temperature oxidation resistance and other characteristics. Additional coatings have been attempted but improved coatings with stability to high and low pH, accelerated corrosion testing, fogging, and resistance to high temperature oxidation are needed.

SUMMARY

Herein is disclosed a layered product and methods of preparing the same. The layered product includes an oxide layer carried by a base metal; and a silicate glass-like layer directly carried by the oxide layer and having a silicate glass-like layer composition that consists or consists essentially of silicon, oxygen, sodium, optionally lithium, and optionally boron. The silicate glass-like layer composition is free of base metal and metal alloy elements (other than silicon, sodium and/or lithium and optionally boron). The silicate glass-like layer composition is, therefore, free of titanium, chromium, and other stainless steels alloy elements (other than silicon, sodium and/or lithium and optionally boron).

The present disclosure relates to protective coatings for metals and processes to prepare the same and, more particularly, to metals and their alloys having a generally thin oxide layer which can be formed naturally or preferably by means of an oxidation process such as passivation. The invention is applicable to any metal or metal alloy to which an oxide layer may tightly adhere.

In a first aspect of the invention there is provided a process for preparing a metal or metal alloy product, the process comprising:

- removing any existing oxide layer from the metal or metal alloy;
- forming an oxide layer on the surface of the metal or metal alloy using chemical passivation or by exposure to a gaseous oxidising environment;
- applying a coating of an aqueous silicate solution to the metal or metal alloy oxide layer; and
- curing the applied coating on the oxide layer to provide a silicate coating layer by:

a) heating the coated, passive layer to a temperature of at least 200° C.; or
b) exposing the coated, passive layer to an infrared source.

Generally speaking, the metal or metal alloy products used in the invention will nearly always have an existing oxide layer, unless (for example) the oxide layer has been removed and been kept in a protective environment to prevent the formation of an oxide layer. Therefore in most embodiments, the methods comprise a step of removing an existing oxide layer from the metal or metal alloy.

A step of exposure to a gaseous oxidising environment may comprise drying the metal or metal alloy. Drying will generally be carried out in air and therefore will entail exposure of the metal or metal alloy to a gaseous oxidising environment.

The method may also comprise a step of cleaning the surface of the metal or metal alloy prior to removing any existing oxide layer. In some embodiments, such as where cleaning is by mechanical treatment (for example, abrasive blasting such as sand blasting), removing an existing oxide layer is accomplished simultaneously with cleaning.

In a second aspect of the invention, there is provided a process for coating a metal or metal alloy product, comprising:

providing a metal or metal alloy with oxide layer removed (for example, providing a pickled metal or metal alloy) according to a method described herein;

forming an oxide layer on the surface of the metal or metal alloy using chemical passivation or by exposure to a gaseous oxidising environment;

applying a coating of an aqueous silicate solution to the metal or metal alloy oxide layer; and curing the applied coating on the oxide layer to provide a silicate coating layer by:

a) heating the coated, passive layer to a temperature of at least 200° C.; or
b) exposing the coated, passive layer to an infrared source.

In a third aspect of the invention, there is provided a process for coating a metal or metal alloy product, comprising:

providing a metal or metal alloy with oxide layer removed and then passivated according to a method described herein;

applying a coating of an aqueous silicate solution to the metal or metal alloy oxide layer; and curing the applied coating on the oxide layer to provide a silicate coating layer by:

a) heating the coated, passive layer to a temperature of at least 200° C.; or
b) exposing the coated, passive layer to an infrared source.

For example, there is provided a process for coating a metal or metal alloy product, comprising:

providing a pickled and then passivated metal according to a method described herein;

applying a coating of an aqueous silicate solution to the metal or metal alloy oxide layer; and curing the applied coating on the oxide layer to provide a silicate coating layer by:

a) heating the coated, passive layer to a temperature of at least 200° C.; or
b) exposing the coated, passive layer to an infrared source.

Coated metal or metal alloys obtained or obtainable by any method described herein are also provided.

In a fourth aspect of the invention, there is provided a product comprising a coating made according to a method described herein.

In a further aspect of the invention, there is also provided a method of preparing a coated article comprising applying (or attaching or affixing) a coated metal or metal alloy product to said article (for example, a component of a complex product, where the component comprises the coated metal or metal alloy). The coated metal or metal alloy is prepared according to a method described herein. The invention also provides a method of preparing a coated article comprising applying an aqueous silicate solution to a metal or metal alloy component of said article according to a method described here. Coated articles obtained by such methods are also provided.

The present invention will now be further defined according to the following preferred features.

DETAILED DESCRIPTION

Figure 1:
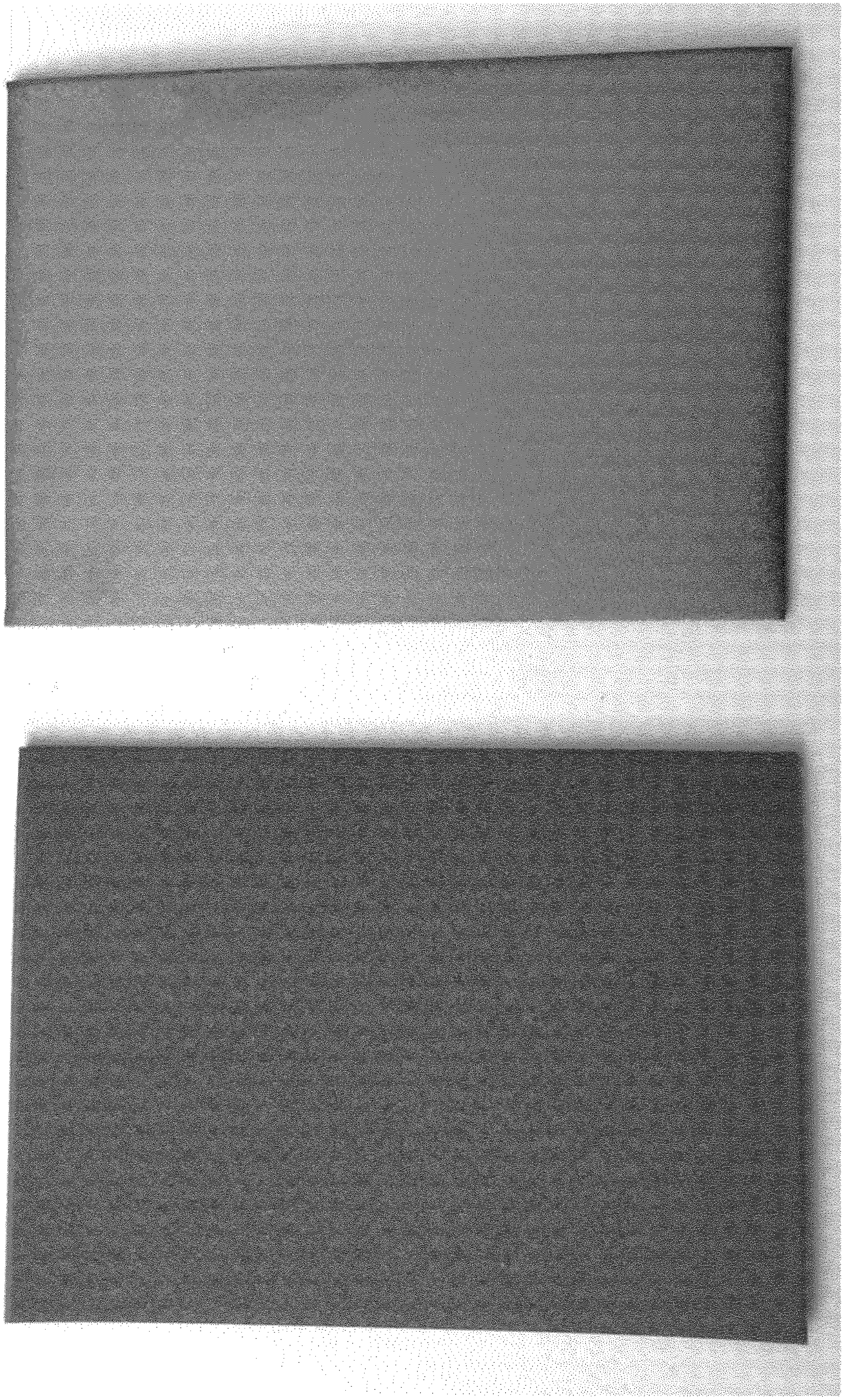
FIG. 1—A photograph of two metal plates (titanium alloy) subjected to a high temperature test. On the left—sample without silicate glass-like layer (sample Ti 7). On the right—sample with silicate glass like layer appears as a uniform unbroken surface without discolouration (sample Ti 4).

The present disclosure is directed to processes for manufacturing and to metal products that demonstrate excellent durability and ease of preparation. In general, a product includes a metal or metal alloy substrate, an oxide layer on the surface of the metal or metal alloy substrate, and a glass-like layer on the oxide layer that is a silicate or borosilicate glass.

There is provided a process for the production of such metal products, comprising:

removing any existing oxide layer from the metal or metal alloy;

forming an oxide layer on the surface of the metal or metal alloy substrate using chemical passivation or exposure to a gaseous oxidising environment;

applying a coating of an aqueous silicate solution to the metal or metal alloy oxide layer; and curing the applied coating on the oxide layer to provide a silicate coating layer by:
a) heating the coated, passive layer to a temperature of at least 200° C.; or
b) exposing the coated, passive layer to an infrared source.

Alternatively, the method as disclosed herein may begin at the step of applying the coating of the aqueous silicate solution to the metal or metal alloy. For example, the method of the invention may comprise:

providing a metal or metal alloy, wherein an prior existing oxide layer from the metal or metal alloy has been removed and a new oxide layer has been formed on the surface of the metal or metal alloy substrate using chemical passivation or exposure to a gaseous oxidising environment;
applying a coating of an aqueous silicate solution to the metal or metal alloy; and
curing the applied coating on the oxide layer to provide a silicate coating layer by:
a) heating the coated, passive layer to a temperature of at least 200° C.; or
b) exposing the coated, passive layer to an infrared source.

Substrate

The processes described herein are undertaken on metals or metal alloy substrates. The methods may begin with a step of providing a metal or metal alloy substrate. The metal or metal alloy will generally comprise an existing (old) oxide layer. For brevity, references to "metal" or "metals" herein include "metal alloy" or "metal alloys", unless the context indicates otherwise. The metal or metal alloy in the metal product can be any metal that allows firm attachment of an oxide layer. An oxide layer, which is securely attached to the base metal, is a metal oxide that is not easily separated or peeled off from the underlying metal layer.

The processes of the invention defined herein can be used on a variety of metals/metal alloys. In one embodiment, the metal or metal alloy may be selected from the group consisting of zinc, manganese, magnesium, aluminium, titanium, iron, chromium, nickel, lead, stainless steel, copper, molybdenum, tin, niobium, and combinations thereof and any other metal with an oxide layer and combinations thereof.

In a particular embodiment, the metal or metal alloy is selected from stainless steel, titanium or titanium alloy.

Due to their properties, titanium and its alloys have found wide applications. Titanium and titanium alloy properties are a combination of high strength and stiffness, low density and good corrosion resistance. Recently, due to durability, titanium and its alloys are becoming a popular material used in jewellery, even though titanium and its alloys were considered until recently too difficult to process and shape into complex and precise patterns. One of the segments of the jewellery market are wedding and engagement rings made of titanium and its alloys as well as envelopes and bracelets for hand-held watches. The main advantage of titanium products is the fact that they do not cause an allergic reaction and are not damaged in water environments. Titanium and its alloys are used by artists to create sculptures and also decorative details and elements of furniture. Titanium and its alloys are also used for the production of sports equipment. They are used where high strength with a minimum weight of the product are needed. The other most popular titanium products are mountaineering equipment, bicycle frames (perfectly absorbing vibrations and resistant to fatigue), tennis rackets, competitive sledges, skis, golf clubs, hockey sticks, cricket sticks, rugby helmet covers and fishing equipment. In addition, titanium and its alloys can be also found in glasses frames (light, durable and not causing skin allergies), in horseshoes (mainly for racehorses) and sporadically sledging. Titanium and its alloys are used for the production of sailing equipment (fittings, blocks, capstan elements, fixed rigging).

The substrate, for example, the titanium, titanium alloy, or stainless steel, can be cast, extruded, hot rolled, cold rolled, annealed, or hardened etc.

On the metal or metal alloy substrate the oxide layer is created and then the silicate or borosilicate glass-like layer is applied. In one instance, the surface of the metal or metal alloy is composed of the oxide layer. In another instance, the layered product includes titanium/titanium alloy/stainless steel; wherein the oxide layer is directly attached to the titanium/titanium alloy/stainless steel surface; wherein the glass-like layer is directly attached to the oxide layer.

The substrate can be, for example, titanium, titanium alloy or stainless steel. The titanium alloy can be selected from all alloys based on titanium. In one example, the titanium alloy consists or consists essentially of the following elements: 0.5% Al, 0.4% Si, and balanced Ti. The stainless steel can be selected from all available alloys. In one preferable example, the stainless steel is 304L alloy consists or consists essentially of the following elements: less than 0.03% C, 18%-20% Cr, 8%-12% Ni, less than 0.75% Si, less than 2% Mn, less than 0.045% P, less than 0.03% S, less than 0.10% N and balanced Fe. In another preferable example, the stainless steel is 316L alloy consists or consists essentially of the following elements: less than 0.03% C, 16%-18% Cr, 10%-14% Ni, 2%-3% Mo, less than 0.75% Si, less than 2% Mn, less than 0.045% P, less than 0.03% S, less than 0.10% N and balanced Fe.

Optionally, the substrate can be composed of, for example, aluminium or an aluminium alloy. The aluminium alloy can be selected from the series consisting of a 1000 series alloy, a 2000 series alloy, a 3000 series alloy, a 4000 series alloy, a 5000 series alloy, a 6000 series alloy, a 7000 series alloy, and an 8000 series alloy. In one preferable example, the aluminium alloy is a 6000 series alloy; in another preferable example, the aluminium alloy is a 3000 series alloy; in still another example the aluminium alloy is a 1000 series alloy.

The substrate used in the present invention does not require a sacrificial coating (for example a zinc coating). Sacrificial coatings are coatings that are applied to a substrate that preferentially degrades (for example oxidises) compared to the underlying metal or metal alloy. However, the methods and coatings of the present invention achieve excellent anti-corrosive properties, without the need for a sacrificial layer. Instead, the new oxide layer is formed directly onto the metal or metal alloy, and the silicate coating is formed directly on the tightly adhered oxide layer.

Cleaning

As noted, the method may also comprise a step of cleaning the metal or metal alloy surface prior to removing any existing oxide layer.

The overall appearance of a metal surface (when not protected by the process of the invention) will degrade under standard environmental conditions, especially when pollutants, e.g. soot, grime, etc., accumulate on or within the pores of the surface. Residual oils from fingerprints are problematic as well. Cleaning of the metal removes all fats, greases, oils, carbon deposits, (a natural by-product of the process of burning gasoline in gasoline engines), and grime. The first step in the process of the present invention may, therefore, be to clean the surface of the metal/metal alloy.

The step of cleaning may comprise removing contaminants from the surface of the metal, such as grease, oil, protein, and scale. The removal of grease and/or oil may be particularly preferred in this step. Removal of such contaminants may refer to the removal in part or preferably the removal of all or substantially all the contaminants from the surface of the metal.

There are several well-known methods of cleaning available to the skilled person. For example, the metal or metal alloy can be cleaned with a wet (i.e. liquid) or dry cleaning agent. Wet cleaning agents include, for example, water or an aqueous solution, including an alkaline solution, an acidic solution or a neutral solution. Wet cleaning agents may include degreasing agents. A wet cleaning agent may comprise a detergent, soap, bleach, alcohol (such as ethanol), organic solvents (such as acetone), and/or ammonia. The precise mode of cleaning and method steps may depend on the amount of contaminants present on the surface of the metal or metal alloy that need to be removed.

An alkaline cleaning agent, such as an alkaline degreaser, or a neutral cleaning agent, is useful to remove, for example, oil and grease. In such embodiments, a detergent, soap, bleach, or ammonia can be used. An acidic cleaning agent may be useful to remove, for example, oil, grease, protein, or scale. Wiping the surface of the metal/metal alloy, for example, with a cloth, may also be employed. The cloth may comprise a wet cleaning agent as described above (i.e. the cloth may be soaked with a wet cleaning agent).

Wet or dry mechanical cleaning methods may be used for cleaning, such as abrasive blasting (for example, sand blasting), grinding, wire brushing, polishing and hydro cleaning. Abrasive blasting, such as sand blasting, may be of specific relevance when the metal or metal alloy is titanium, or a titanium alloy or stainless steel but is also applicable to other metals. Mechanical cleaning usually also achieves the removal of the oxide layer. A step of abrasive blasting (for example, sand blasting) may preferably be followed by a step of washing. The step of washing removes any remaining abrasive agent (e.g. grit (such as carbon steel grit or stainless steel grit or sand grit)) from the abrasive blasting step. Use of stainless steel grit or sand for abrasive blasting may be preferred. A step of pickling may be employed even if a step of abrasive blasting is used to clean the metal or metal alloy. However, use of certain abrasive agents, such as sand or stainless steel grit, may avoid the need for a pickling step.

Accordingly, the process may comprise a step of cleaning the surface of the metal or metal alloy, wherein the step of cleaning the surface of the metal comprises removing grease and/or oil from the surface of the metal or metal alloy.

The cleaning step may comprise multiple cleaning steps. For example, in some embodiments, the step of cleaning comprising a step of abrasive blasting (for example sand blasting) and a step of degreasing the surface. In some embodiments, the step of abrasive blasting may occur before the step of degreasing, if both steps are present. In some embodiments, it may be necessary or advisable to wash or rinse the metal or metal alloy following abrasive blasting.

Removal of an Oxide Layer

After the optional, although preferred, step of cleaning the metal surface, any existing or natural oxide layer should be (completely) removed prior to controlled oxidation. The oxide layer can be removed by chemical or mechanical means. This step may also serve to prepare the substrate surface for further processes by removing scale (e.g. from heat treatment if not desired), foreign substances present as surface contamination, surface damage, production defects, tarnish, uneven surface, or stains. All such contaminations and defects may interfere with corrosion resistance, stability, quality, and general appearance.

Generally speaking, the metal or metal alloy product will nearly always have an existing (old) oxide layer, unless (for example) the oxide layer has been removed and the product has been kept in a protective environment to prevent the formation of an oxide layer. Therefore, in most embodiments, the methods comprising a step of removing an existing oxide layer from the metal or metal alloy. Accordingly, the methods are generally methods conducted on a metal or metal alloy comprising an oxide layer. The existing oxide layer is one that is insufficiently uniform to allow proper coating and to realise the advantages of the invention. Hence, the step of removing said oxide layer (and allowing a new oxide layer to form, either by exposure to a gaseous oxidising environment such as air or by chemical passivation) is required prior to the step of coating.

Removal by Pickling

The step of removing the oxide layer by chemical means may comprise a step of pickling. The existing oxide layer may be removed from the metal or metal alloy by pickling using an acidic pickling solution.

The process can comprise pickling the metal or metal alloy by exposing the substrate to pickling agent. Pickling removes oxides, scales (e.g. from heat treatment), foreign substances present as surface contamination, surface damage, production defects, tarnish, uneven surface, stains, grit remains, or alpha case; all such contaminations and defects may interfere with corrosion resistance, stability, quality, and general appearance.

Pickling can be carried out by contacting the surface of the metal or metal alloy with a pickling solution. The pickling solution can be contacted to the surface of the metal or metal alloy according to any suitable method. For example, the pickling solution may be contacted to the surface by immersion in the solution or application of the solution to the surface of the metal or metal alloy, for example, by spraying or roll coating. Pickling solutions can also be applied in the form of gels or pastes, etc.

Pickling removes all or substantially all of an oxide layer present on the surface of the metal or metal alloy, without corroding or substantially corroding the metal or metal alloy itself. The acidic pickling solution may comprise nitric acid, hydrofluoric acid, chloric acid, sulphuric acid, phosphoric acid, sodium persulphate, hydrogen peroxide, or a combination thereof. In one embodiment the pickling solution comprises nitric acid and/or hydrofluoric acid. In a preferred embodiment, the pickling solution comprises hydrofluoric acid and nitric acid.

In some embodiments, the pickling solution comprises nitric acid and/or hydrofluoric acid but does not comprise chloric acid, sulphuric acid, phosphoric acid, sodium persulphate, hydrogen peroxide, or a combination thereof. In some embodiments, the pickling solution comprises nitric acid and/or hydrofluoric acid, but does not comprise any other acid.

In one embodiment, the pickling solution has a pH of from about 0 to about 3, for example, a pH of about 1.

The pickling solution may also further comprise other components, such as accelerants, inhibitors, wetting agents, or proprietary solutions.

The effectiveness of acid pickling may increase by elevating the temperature (e.g. the speed and efficiency of pickling). However, there may be an upper temperature limit, for example, due to the risk of over-pickling. In one embodiment the pickling is carried out at ambient/room temperature. Ambient temperature and room temperature are used interchangeably herein and may be from about 15° C. to about 25° C. In another embodiment, pickling is carried out at a temperature of at least about 15° C.

The step of pickling may be carried out for at least about 1 minute, at least about 10 minutes, or at least about 20 minutes. In some embodiments, pickling may be carried out for at least about 20 minutes. In such embodiments, the length of time used to conduct the step of pickling refers to the amount of time the pickling solution is in contact with the metal or metal alloy. Accordingly, the method may comprise removing the pickling solution from the metal (for example by washing) after the appropriate period of time has elapsed. Alternatively, the substrate could simply be withdrawn from the pickling solution if it has been immersed in it (followed by optional washing to remove excess solution).

When nitric acid is used in the pickling solution, the method may comprise the use of from about 5% to about 25% v/v of 70% nitric acid. When hydrofluoric acid is used in the pickling solution, the method may comprise the use up to 5% v/v of 60% hydrofluoric acid. Preferably, although not essentially, when both nitric acid and hydrofluoric acid are used in the pickling solution, the acid percentage ratio should be about 10:1 (to minimise the formation of free hydrogen).

In one embodiment, the composition of pickling acids is about 10% to about 20% v/v (about 150 g/L to about 300 g/L) of 70% nitric acid and about 1% to about 2% v/v (about 12 g/L to about 24 g/L) of 60% hydrofluoric acid, for example, at ambient/room temperature or higher.

In a specific embodiment, 15% v/v of 70% nitric acid and 1.5% v/v of 60% hydrofluoric acid may be used, for example, for at least 20 minutes at ambient/room temperature.

The step of pickling may be terminated by removing the pickling solution (for example by washing).

When pickling is used to remove an existing oxide layer, the time the metal or metal alloy is exposed to a gaseous oxidising environment (e.g. air) before the next step of the method may be limited, to prevent degradation of the metal or metal alloy prior to the next steps of the method. For example, in methods comprising pickling and chemical passivation, the step of chemical passivation may occur within about 1 hour (for example within about 20, within about 15, within about 10 or within about 5 minutes) of the step of completion of the step of pickling. Longer periods may be endured, in particular if the pickled metal or metal alloy is disposed in a protective environment (i.e. one that eliminates or substantially eliminates oxidation, such as an inert atmosphere, or at least limits uncontrolled natural passivation, for example placing the metal or metal alloy in water) to prevent degradation of the metal. If a protective environment is used, this may allow much longer period of time between the step of pickling and the step of chemical passivation. In some embodiments, the pickled metal or metal alloy is exposed to a gaseous oxidising environment (for example air) for up to about 1 hour (for example up to about 20, up to about 15, up to about 10 or up to about 5 minutes) before initiating the step of chemical passivation. This prevents or minimises a new oxide layer forming by natural passivation if a step of chemical passivation is to be used instead.

Other Methods of Removal

Alternative methods are available for removing oxide layers from the metal or metal alloy. Alternative methods may include mechanical cleaning such as abrasive blasting, grinding, wire brushing, and hydrocleaning. For example, the method may comprise smooth clean surface (SCS) and/or eco pickled surface (EPS), for example, as described in U.S. Pat. Nos. 9,333,625, 8,707,529, 8,128,460, 8,074,331, 8,066,549, 8,062,095 and 7,601,226. The SCS process comprises abrasive removal of oxidation from the surface of the metal or metal alloy. The EPS process also employs mechanical means to remove the oxide layer, specifically using "slurry blasting". The slurry comprises a mixture of water and fine steel particles. The slurry removes the oxide layer but not the underlying metal substrate.

Accordingly, a method comprising removing the oxide layer by mechanical means may comprise removing the oxide layer by abrasive blasting, grinding, wire brushing, hydrocleaning, or combinations thereof. Mechanical methods generally might not provide as clean surface as pickling does, so pickling may be preferred. It is noted that the use of mechanical means to remove the oxide layer may also "clean" the surface of the material. Accordingly, some embodiments of the invention employ mechanical means to remove the oxide layer (such as abrasive blasting) which acts as the step to both clean the surface of the material and to remove any existing oxide layer. Accordingly, some embodiments of the invention comprise mechanical treatment (for example, abrasive blasting) of the surface of the material, followed by the passivation and coating steps. In other embodiments, the invention comprises mechanical treatment (for example abrasive blasting) optionally followed by washing, for example with water, and then coating. Washing by water can be achieved by any suitable means, for example, rinsing, immersion etc. Given the step of washing with water will generally occur in an air-filled room (and indeed all of the steps of the methods may be carried out in air), the step of washing with water may allow simultaneous formation of a new oxide layer on the metal or metal alloy. Accordingly, in some embodiments, there is no completely separate step of forming a new oxide layer, since this can happen simultaneously with the prior steps if they are conducted in air.

In some embodiments, the methods may comprise a combination of abrasive blasting and pickling, followed by the passivation and coating steps. In some embodiments, the methods may comprise a combination of abrasive blasting, degreasing (for example using an alkali degreasing solution) and pickling, followed by the passivation and coating steps. When pickling takes places, it will generally occur after the abrasive blasting and degreasing steps. When degreasing takes place, it may occur after any abrasive blasting step that takes place. When passivation takes place, it may comprise chemical passivation or exposure to a gaseous oxidising environment, such as air.

Methods of the invention may comprise the provision of a metal or metal alloy that has already had an oxide layer (e.g. natural oxide layer) removed.

In some embodiments, methods of the invention that comprise removal of an existing oxide layer by abrasive blasting do not comprise a step of pickling and/or do not comprise a step of chemical passivation.

After removal of the oxide layer (for example, by pickling or mechanical treatment such as abrasive blasting), additional steps may be taken to prevent a further chemical change of the metal or metal alloy before an active step of passivation. For example, in one embodiment, the metal or metal alloy with oxide layer removed (e.g. the pickled metal or metal alloy) may be maintained in water or in another protective environment. In practice, unless the process is conducted in a controlled environment, such as in an inert atmosphere, to prevent formation of oxides by oxidation in air, a method comprising a step of adding a new oxide layer using chemical passivation may include the formation of some oxides by natural passivation, given the metal or metal alloy will be exposed to air for a short period of time. The formation of oxides by natural passivation in air is, though, preferably controlled by limiting the total exposure time of the metal or metal alloy to air.

Preferably, regardless of the method used to remove the old oxide layer, the step of removing the oxide layer removes the existing old layer entirely. Any oxides present on the surface of the metal or metal alloy are new, in that they formed after the start of the process.

Once the oxide layer is removed, metal or metal alloys are ready for the next step of the method: passivation. Passivation follows directly the process of removal of the oxide layer, or may begin or occur at the same time as removal of the old oxide layer (for example in the case of removal of an oxide layer by mechanical treatment that is carried out in an air-filled room). The invention does not require any additional steps between removal of the oxide layer process and passivation process, other than optional washing or rinsing steps. There are generally no intermediate steps between completion of the step of removal of the oxide layer (which, depending on the method used, could include, for example, a step of washing the metal or metal alloy, such as when abrasive blasting such as sand blasting is used to remove the oxide layer or when pickling is used to remove the oxide layer) and the initiation of the passivation step.

Passivation

After the metal or metal alloy has been optionally cleaned and the oxide layer has been removed, a new, uniform, oxide layer is formed by passivation. The step of passivation is chemical passivation or passivation by exposure to a gaseous oxidising environment such as by exposure to air (also referred to as natural passivation, but conducted under controlled conditions and/or for a limited period of time). A step of passivation may be achieved by drying (which would usually require exposure of the metal or metal alloy to a gaseous oxidising environment such as air). The new oxide layer is carried by the metal or metal alloy substrate.

Oxide layers can generally be prepared by anodisation or through the technological process of passivation of the metal or metal alloy. While chemically similar, the structures of the oxide layers provided by different methods are, crucially, distinct. The oxide layer created in those processes can have amorphous or crystalline structure. Notably, the metal or metal alloy surface is not a single-crystal line (and the surface orientation may include various crystal orientations). Methods described herein, therefore, comprise forming an amorphous oxide layer. This is because methods of forming an oxide layer on a metal or metal alloy using chemical passivation or exposure to a gaseous oxidising environment, such as air, will provide an amorphous structure and not a crystalline structure. The present inventors have surprisingly found forming a new, amorphous, oxide layer on the surface of the metal or metal alloy in combination with the coating steps provides the best results.

Methods of the present invention do not include a step of adding an oxide layer to the metal or metal alloy by electrical and/or electrolytic passivation, including anodisation. The present inventors have unexpectedly found the silicate coating can be applied to a metal or metal alloy that has not undergone a process of electrical or electrolytic passivation such as anodisation. Accordingly, in embodiments of the invention, the oxide layer is not crystalline. Instead, the oxide layer is amorphous.

Methods of the present invention unexpectedly improve the appearance of the metal or metal alloy. This is because methods comprising anodisation may change the colour of the material, especially when the metal used is selected from the group consisting of titanium, titanium alloy and stainless steel, whereas passivation using chemical passivation or exposure to a gaseous oxidising environment (for example, when drying) allows an amorphous oxide layer to form that unexpectedly improves the appearance of the metal product by retaining a more "natural" appearance. In addition, the combination of passivation by chemical means or exposure to a gaseous oxidising environment (for example, when drying) and removal of an oxide layer (for example, by pickling or mechanical treatment such as abrasive blasting) unexpectedly provides a material with a smoother surface, compared to metals that have been coated using a method that comprises passivation by anodisation. When combined with the other steps of the methods of the invention, the process provides a very durable and resistant material, that also retains the natural look of the metal, even when exposed to high temperatures and oxidation (as discussed further in the Examples).

Chemical passivation is an example of a conversion coating, in which the metal surface is converted into the coating by means of a chemical process. The present invention is designed to be used in conjunction with a passive coating.

Unlike pickling, which removes an oxide layer from the surface of the metal or metal alloy, chemical passivation causes an oxide layer to form on the surface of the metal or metal alloy.

In some embodiments, unless abrasive blasting is used, methods of the invention do not comprise or rely upon natural passivation (other than, possibly, any natural passivation that takes place when carrying out the other steps of the method, which can be limited by limiting exposure of the metal or metal alloy to air by limiting the time that elapses between successive steps of the method and/or by using a protective atmosphere). In natural passivation, an oxide layer may form on the surface of the metal or metal alloy when kept in air at room temperature. The methods of the invention may therefore rely on chemical passivation as a result of the application of a passivating solution. The results may be more reliable, more controllable, and quicker. However, the combination of abrasive blasting to remove an existing oxide layer and controlled natural passivation (i.e. exposure to a gaseous oxidising environment such as air for a limited period of time) has been shown by the present inventors to be particularly beneficial.

Accordingly, in some embodiments, the method does not comprise natural passivation, or electrical or electrolytic passivation of the metal or metal alloy. In some embodiments, the step of adding an oxide layer to the metal or metal alloy consists of a step of chemical passivation. In other embodiments, the method comprises a step of controlled natural passivation for a limited period of time, in particular in combination with a prior step of removal of an oxide layer by abrasive blasting such as sandblasting.

In one embodiment, the oxide layer can be prepared in a controlled technological process of chemical passivation. Natural oxide layers and those created by passivation are much thinner than typical anodised oxide layers. Preferably, the oxide layer can be generated by the controlled process of passivation. Preparing the oxide layer by passivation the metal substrate allows control of certain desired properties, including, for example, evenness of the surface. After the process of passivation, the material can be exposed to high temperatures to obtain different colours of the substrate. Any previous or natural oxide layer is removed prior to controlled oxidation, for example, as described above using pickling or mechanical treatment.

The steps of either chemical passivation or oxidation by exposure to a gaseous oxidising environment (such as air) are discussed in more detail below.

Chemical Passivation

The step of chemical passivation, if present, is carried out using a passivating solution. The optionally cleaned and de-oxidised metal or metal alloy is contacted with a passivating solution. The passivating solution can be contacted to the surface of the metal or metal alloy according to any suitable method. For example, the passivating solution may be contacted to the surface by immersion in the solution or application of the solution to the surface of the metal or metal alloy, for example, by spraying or roll coating.

The passivating solution can comprise nitric acid, sulphuric acid, phosphoric acid, citric acid, hydrogen, peroxide and/or sodium, dichromate or combinations thereof. In one embodiment the passivating solution comprises an acid selected from the group consisting of nitric acid and citric acid.

The passivating solution does not generally comprise hydrofluoric acid.

In one embodiment the passivating solution comprises from about 1% to about 30% w/v citric acid or about 15% to about 30% v/v of 70% nitric acid.

In one embodiment the passivating solution comprises from about 15% to about 30% v/v of 70% nitric acid. In one embodiment the passivating solution comprises from about 1% to about 15% w/v of citric acid. Accordingly, the passivating solution may be selected from the group consisting of:

a) a passivating solution comprising from about 15% to about 30% v/v of 70% nitric acid; and
b) a passivating solution comprising from about 1% to about 15% w/v of citric acid.

In a specific embodiment, the passivating solution comprises about 22.5% v/v of 70% nitric acid, which may be applied for about 30 minutes at ambient temperature, or about 7% w/v of citric acid, which may be applied for about 30 minutes at ambient temperature.

In one embodiment the passivating solution has a pH of about 0 to about 3, for example, a pH of about 1.

The step of chemical passivation can be conducted for at least about 3 minutes. In another embodiment the step of chemical passivation can be conducted for at least 4 minutes. In another embodiment, the step of passivation can be carried out for at least 20 minutes. In another embodiment, the step of chemical passivation can be conducted for up to 1 hour or up to 2 hours.

In such embodiments, the length of time used to conduct the step of passivation refers to the amount of time the passivating solution is in contact with the metal or metal alloy. Accordingly, the method may comprise removing the passivating solution from the metal (for example by washing) after the appropriate period of time has elapsed. For example, the substrate is withdrawn from the passivating solution if it has been immersed in it (followed by optional washing to remove excess solution).

As with pickling, the rate of passivation can be influenced by temperature. In one embodiment, the passivation (e.g. chemical or controlled natural passivation) is conducted at a temperature of between about 15° C. and about 80° C. In another embodiment, the step of passivation (e.g. chemical or controlled natural passivation) is conducted at a temperature of from about 15° C. to about 70° C. Generally, passivation (e.g. chemical or controlled natural passivation) can be conducted at room temperature (for example, from about 15° C. to about 25° C.).

In specific embodiments:

a) the passivating solution comprises 20%-25% v/v of 70% nitric acid and passivation may be conducted at room/ambient temperature for a minimum 30 minutes
b) the passivating solution comprises 20%-25% v/v of 70% nitric acid and passivation may be conducted at 45° C.-60° C. for a minimum 20 minutes
c) the passivating solution comprises 4%-10% w/v of citric acid and passivation may be conducted at a temperature of 20° C.-50° C. for a minimum 20 minutes
d) the passivating solution comprises 4%-10% w/v of citric acid and passivation may be conducted at a temperature of 50° C.-60° C. for a minimum 10 minutes
e) the passivating solution comprises 4%-10% w/v of citric acid and passivation may be conducted at a temperature of 60° C.-70° C. for a minimum 4 minutes
f) other combinations of temperature, time, and acid with or without accelerants, inhibitors or proprietary solutions capable of producing parts that pass the specified test requirements are possible.

In one embodiment, the coated oxide layer prepared by the chemical passivation has a thickness of less than about 50 μm. The oxide layer can have a thickness of less than about 50 μm, 40 μm, 30 μm, 25 μm, 20 μm, 10 μm, 5 μm, 4 μm, 3 μm, 2 μm, or 1 μm, optionally as thin as 1 nm. For example, the oxide layer may have a thickness of from about 1 nm to about 25 μm. In one particular example, the oxide layer has a thickness less than about 10 μm and the glass-like layer has a thickness less than about 5 μm. The glass-like layer can have a thickness of less than about 5 μm, 4 μm, 3 μm, 2 μm, 1 μm, 500 nm, 400 nm, 300 nm, 200 nm, optionally as thin as 100 nm. In one particular example, the oxide layer has a thickness less than about 2 μm and the glass-like layer has a thickness less than about 550 nm.

The skilled person will appreciate that in some embodiments, methods may comprise a step of providing a metal or metal alloy that has already had a new passive oxide layer applied to it. The presence of an oxide layer on the metal or metal alloy, particularly a smooth oxide layer (e.g. those oxide layers obtained by chemical passivation or exposure to a gaseous oxidising environment), is important for the advantages of the invention. A bare metal without an oxide layer will perform poorly. There are no specific restrictions on the thickness of the oxide layer. However, preferably the oxide layer is of a suitable thickness. A thicker oxide layer, for example, may reduce the reflectance of the underlying metal layer, so thinner oxide layers lead to improved reflectance, a trait commonly desired in metals. Therefore, the oxide layer's thickness can be selected to give the desired performance characteristics in the final product while still providing a high degree of high temperature oxidation resistance, corrosion resistance, and thermal resistance. Furthermore, coated titanium/titanium alloy/stainless steel loses electricity conduction properties and becomes an insulator. The coating also allows for extension of the life of the products, increasing resistance to abrasion, corrosion, and pollution.

The herein disclosed oxide layer is, preferably, free of silicates. That is, the oxide layer does not include glass forming silicon oxides (e.g. $SiO_2$) or borosilicates, or mixtures thereof, unless the underlying metal alloy comprises silicon or boron. In such cases, trace amounts of silicon oxides or borosilicates may be present in the oxide layer. In one instance, the oxide layer has a composition that consists of one or more oxides of the metal or metal alloy. Preferably, the metal/metal alloy oxide layer composition is free of silicon, unless the metal or metal alloy itself comprising silicon. In some embodiments, the oxide layer may be free of nickel.

The combination of the new oxide layer on the metal or metal alloy with the silicate or borosilicate glass-like layer provides a temperature and oxidation-resistant coating. In some embodiments, the product comprises temperature and oxidation-resistant coating.

When using aluminium, the aluminium oxide layer can include about 70% w/w to about 90% w/w $Al_2O_3$, about 2.5% w/w to about 7.5% w/w $H_2O$, and about 10% w/w to about 20% w/w $SO_3$; about 75% w/w to about 85% w/w $Al_2O_3$, about 3.5% w/w to about 5.5% w/w $H_2O$, and about 12.5% w/w to about 17.5% w/w $SO_3$; or about 80%-81% w/w $Al_2O_3$, about 5%-6% w/w $H_2O$, and 14%-15% w/w $SO_3$. In alternative examples, the aluminium oxide layer can be free of $SO_3$.

The aluminium oxide layer can include a boehmite/bayerite region without deviating from the compositional ranges provided above. Notably, the boehmite/bayerite region includes a hydrated aluminium oxide, that is, an aluminium oxide with a higher proportion of hydroxyl groups than a dehydrated aluminium oxide. For example, the boehmite/bayerite region includes AlO(OH) and/or $Al(OH)_3$ groups. In examples, with the boehmite/bayerite region, the boehmite/bayerite region is directly attached to the silicate glass-like layer. In one example, the boehmite/bayerite region is within the aluminium oxide layer, with a higher proportion of hydroxyl groups, and is positioned between a region with a lower proportion of hydroxyl groups and the silicate glass-like layer. In another example, the boehmite/bayerite region extends through the entire aluminium oxide layer. The boehmite/bayerite region may be identified in TOF-SIMS plots of aluminium counts over time (depth). Without being bound to theory, variation in aluminium counts at or near the silicate glass-like layer can be due to an increased friability of the boehmite/bayerite region compared to the majority of the aluminium oxide layer. This variation, as seen between milling times of about 1300 and 2000, is believed to be or is indicative of the boehmite/bayerite region.

Preferably, the composition of the oxide layer is consistent across and through the layer. The consistency of the composition can be determined from the concentration of the metal or metal alloy component in the oxide layer by SEM/EDS. Optionally the metal (for example, titanium or chromium) concentration varies by less than 5%, 4%, 3%, 2%, or 1% across and through the oxide layer.

The consistency of the composition can also be determined from the oxygen concentration in the oxide layer by SEM/EDS. Optionally the oxygen concentration varies by less than 5%, 4%, 3%, 2%, or 1% across and through the oxide layer.

The step of chemical passivation may be terminated by removing the passivating solution (for example by washing).

Exposure to an Oxidising Environment (for Example Air)

In some embodiments, a new oxide layer may be formed by exposure to a gaseous oxidising environment in particular a gaseous environment comprising oxygen (for example, by exposure to air), instead of using chemical passivation (or in some cases in combination with a step of chemical passivation). A step of drying involves exposure to a gaseous oxidising environment (such as contact with air). Although exposure to air may be preferred for simplicity, exposure to any gaseous environment comprising oxygen may be used to form the new oxide layer by controlled natural passivation.

Exposure to a gaseous oxidising environment such as air is done for a period of time sufficient for an oxide layer to form, but equally is limited to prevent uncontrolled natural passivation. Accordingly, in some embodiments, the method comprises exposing the metal or metal alloy (after an existing oxide layer has been removed) to a gaseous oxidising environment, such as air. When this form of passivation is used, the metal or metal alloy is exposed to the gaseous oxidising environment for a limited period of time. This may be important to maintain the quality of the new oxide layer and to realise the advantages of the invention when the newly oxidised metal or metal alloy is coated. In some embodiments, the metal or metal alloy is exposed to the gaseous oxidising environment (e.g. air) for up to 48 hours or up to 24 hours to form a new oxide layer. This generally means the next step of coating the metal or metal alloy occurs after the metal or metal alloy has been exposed to the gaseous oxidising environment (such as air) for up to 48 hours (or up to 24 hours). As noted above, adding a new oxide layer by exposure to a gaseous oxidising environment may be particularly relevant to embodiments in which an old oxide layer has been removed by abrasive blasting, such as sand blasting. Exposure times may refer to the cumulative exposure time of the metal or metal allow to air from the beginning of the process through to the step of coating.

When controlled natural passivation (i.e. exposure to a gaseous oxidising environment, e.g. drying) is used to add the oxide layer to the optionally cleaned metal or metal alloy from which the initial oxide layer has been removed (for example, by pickling or mechanical treatment such as abrasive blasting), the controlled natural passivation step may be performed at room temperature (from about 15° C. to about 25° C.). Alternatively, the metal or metal alloy may be exposed to temperatures of up to, for example, about 700° C., for example, to dry the metal or metal alloy. The temperature selected may depend on the metal or metal alloy that is used. The skilled person will be able to select an appropriate temperature according to the circumstances. Heating may also be employed where deliberate colouration of the metal or metal alloy is required.

The metal or metal alloy may be exposed to a gaseous oxidising environment (e.g. dried) for a sufficient time to permit the formation of a new oxide layer on the surface of the metal or metal alloy. In some embodiments, the metal or metal alloy may be allowed to form a new oxide layer (e.g. may be allowed to dry) for up to 48 hours or up to 24 hours.

In some embodiments that employ a step of exposure to a gaseous oxidising environment, for example, by drying, the method may comprise exposing the metal or metal alloy to a gaseous oxidising environment (such as air) for at least about 10 minutes and up to 48 hours at a temperature of at least about 15° C. to form a new oxide layer. For example, in some embodiments, the method may comprise exposing the metal or metal alloy to a gaseous oxidising environment (such as air) for about 10 minutes to about 48 hours at a temperature of from about 15° C. to about 25° C. In some embodiments, the method may comprise exposing the metal or metal alloy to a gaseous oxidising environment (such as air) for about 10 minutes to about 24 hours at a temperature of from about 15° C. to about 25° C. In some embodiments, the method may comprise exposing the metal or metal alloy to a gaseous oxidising environment (such as air) for about 10 to about 120 minutes at a temperature of from about 15° C. to about 25° C. When using such temperatures, which are typical room temperatures, drying (if the metal or metal alloy is wet) occurs by evaporation. When no heat needs to be applied, for example, to form a coloured finish, the time of exposure of the metal or metal alloy to a gaseous oxidising environment may therefore refer to the minimum and maximum times between the step of removing the existing oxide layer and applying the coating.

Heating may be employed to hasten the drying process, although heating may also be used if a coloured layer is desired, as heating can produce different coloured layers on the metal or metal alloy. In some embodiments that employ a step of creating an oxide layer comprising exposing the metal or metal alloy to heat, the method may comprise exposure of the metal or metal alloy to a gaseous oxidising environment (such as air) for at least about 10 minutes at a temperature of from about 25° C. to about 700° C. In one embodiment, the method may comprise exposure of the metal or metal alloy to a gaseous oxidising environment (e.g. air) for at least about 10 minutes up to about 48 hours at a temperature of from about 25° C. to about 700° C. In one embodiment, the method may comprise exposure of the metal or metal alloy to a gaseous oxidising environment (e.g. air) for at least about 10 minutes up to about 24 hours at a temperature of from about 25° C. to about 700° C. In one embodiment, the method may comprise exposure of the metal or metal alloy to a gaseous oxidising environment (e.g. air) for at least about 10 minutes up to about 120 minutes at a temperature of from about 25° C. to about 700° C.

A step of exposure to a gaseous oxidising environment (for example during drying) may take place in the air, or in any gas environment that comprises oxygen. References to "the air" herein mean the normal atmosphere of the earth, for example, air comprising about 78% nitrogen, about 21% oxygen, and about 1% other gases.

Chemical passivation may be preferred to methods comprising passivation by exposure to a gaseous oxidising environment, such as air (e.g. drying). This is because oxide layers produced by chemical passivation will have fewer defects and provide final coated products with superior properties. However, exposure to a gaseous oxidising environment (such as air) may be preferred in some embodiments, for example, embodiments in which the oxide layer is removed by mechanical treatment such as by abrasive blasting (for example sand blasting).

After passivation is complete, additional steps may be taken to prevent a further chemical change of the metal or metal alloy before application of the aqueous silicate solution. This may be particularly relevant in methods comprising a step of chemical passivation, to prevent further oxidation of the metal by natural passivation, although of course the methods comprising exposure of the metal or metal alloy to air are limited in the length of time the metal or metal alloy is exposed. For example, in one embodiment, the metal or metal alloy which has had an oxide layer removed (e.g. by pickling or by mechanical treatment such as abrasive blasting) and a new oxide layer added by passivation may be maintained in water until the time for application of the aqueous silicate solution. Maintaining the substrate in a protective environment eliminates or substantially eliminates further oxidation prior to the step of coating, and maintaining the substrate in water will prevent uncontrolled natural passivation. Alternatively, or additionally, the metal or metal alloy which has had an oxide layer removed (e.g. by pickling or by mechanical treatment such as abrasive blasting) and a new oxide layer added by chemical passivation may be contacted with the aqueous silicate solution preferably within 1 hour (for example within 20, 15, 10, or 5 minutes) of a conclusion of the chemical passivation process. In other words, after the step of adding a new oxide layer by chemical passivation, the metal or metal alloy is exposed to a gaseous oxidising environment (for example air) for less than 1 hour (for example less than 20, 15, 10 or 5 minutes) before being contacted with the aqueous silicate solution initiation.

Given the step of chemical passivation will generally be carried out in a room with air present, the methods may comprise forming a new oxide layer by a combination of chemical passivation and exposure to air. However, the length of time the metal or metal alloy is exposed to air may be limited to prevent uncontrolled natural passivation. The cumulative time from the beginning of the process (i.e. the from the initiation of the step of removing the existing oxide layer or a prior step of cleaning, if present) the metal or metal alloy is exposed to a gaseous oxidising environment (for example air) prior to the step of coating may be up to 48 hours, for example, up to 24 hours. In some embodiments, in particular those comprising pickling and chemical passivation, the metal or metal alloy may be exposed to a gaseous oxidising environment (for example air) between the step of pickling and chemical passivation, and again between the step of chemical passivation and coating. In such embodiments, the metal or metal alloy may be cumulatively exposed to a gaseous oxidising environment (for example air) for up to about 2 hours prior to the step of coating.

In some embodiments, prior to the step of application of the silicate glass-like layer, the methods comprise the steps of:

removing an existing oxide layer from the metal or metal alloy by abrasive blasting;

washing the blasted metal or metal alloy;

exposing the metal or metal alloy to a gaseous oxidising environment (for example air) to form a new oxide layer on the surface of the metal or metal alloy.

The skilled person would understand that the process of abrasive blasting (such as sandblasting) is a process that is generally conducted in air. Given the speed at which oxide layers may form on blasted metals or metal alloys (essentially instantaneously on contact with air, depending on the metal or metal alloy being used), a new oxide layer may begin to form on the metal or metal alloy virtually simultaneously during the process of sandblasting to remove the existing (i.e. old) oxide layer. Hence the step of forming a new oxide layer on the surface of the metal or metal alloy by exposure to air may begin or occur concurrently with the step of removing an existing oxide layer from the metal or metal alloy by abrasive blasting. However, there will generally be a period of time after the step of removing the oxide layer by blasting is completed in which the blasted metal or metal alloy is continued to be exposed to air, during which time the new oxide layer will continue to form. In some embodiments which specify the length of time the metal or metal alloy is exposed to a gaseous oxidising environment (for example air) to allow a new oxide layer to form, the specific length of time (for example, up to 48 hours or up to 24 hours) may be calculated starting from the initiation of the blasting step. In other embodiments which specify the length of time the metal or metal alloy is exposed to a gaseous oxidising environment (for example air) to allow a new oxide layer to form, the specific length of time (for example, up to 48 hours or up to 24 hours) is calculated starting from the completion of the step of blasting (which may include a step of washing or rinsing). In practice, the skilled person would realise the difference in overall exposure time may be minimal and therefore will not affect the final properties of the coated metal or metal alloy. What is relevant is the formation of a new oxide layer, i.e. one that did not exist at the start of the process, the new oxide layer replacing the old (i.e. existing) oxide layer present at the start of the process.

In some embodiments, prior to the step of application of the silicate glass-like layer, the methods comprise the steps of:

- removing an existing oxide layer from the metal or metal alloy by abrasive blasting;
- washing the blasted metal or metal alloy;
- exposing the metal or metal alloy to a gaseous oxidising environment (for example air) for up to 48 hours to form a new oxide layer on the surface of the metal or metal alloy.

In some embodiments, prior to the step of application of the silicate glass-like layer, the methods comprise the steps of:

- removing an existing oxide layer from the metal or metal alloy by abrasive blasting;
- washing the blasted metal or metal alloy;
- exposing the metal or metal alloy to a gaseous oxidising environment (for example air) for up to 24 hours to form a new oxide layer on the surface of the metal or metal alloy.

The step of "washing the blasted metal or metal alloy" in the embodiments above may comprise washing the blasted metal or metal alloy by rising with or immersion in water and/or alkaline degreasing solution. The step of washing may be performed to remove the abrasive agent used in the abrasive blasting step.

Metal or metal alloys having the new oxide layer are ready for the next step of the method: application of the aqueous silicate solution to provide the silicate glass-like coating. Application of the silicate glass-like layer follows directly the passivation process (including any washing steps when needed). The invention does not require any additional steps between the passivation process and applying the silicate gloss-like layer (with the possible exception of, for example, a sealing step, for example, when using an aluminium or aluminium alloy substrate). The invention notably does not require the application of any primers or base coating, which would in fact adversely impact the functioning of the invention.

Silicate Glass-Like Layer

After the metal alloy is optionally cleaned, had any existing oxide layer removed, and had a new, even, oxide layer created by chemical passivation, it is ready for application of the silicate glass-like coating. The silicate glass-like coating is cured on to the oxide layer to provide a silicate coating layer, for example, by heating the coated, passive layer to a temperature of at least 200° C.; or exposing the coated, passive layer to an infrared source. The silicate glass-like coating is the last layer to provide the temperature and oxidation resistance properties to the substrate.

The glass-like layer (which may also be considered a glass layer) is derived from an aqueous solution of alkali metal silicate compounds that optionally contains a borate compound. Accordingly, references herein to "silicate glass-like layer" include borosilicate glass-like layers.

The aqueous silicate solution may comprise $SiO_2$ and a $M_2O$, and optionally $B_2O_3$, wherein M is selected from Li, Na, K, and a mixture thereof. The aqueous silicate solution may comprise a ratio of $SiO_2$ to $M_2O$ of about 2.0 to about 3.8 and, when $B_2O_3$ is present, a ratio of $SiO_2$ to $B_2O_3$ of about 10:1 to about 200:1.

Notably, the components of the silicate or borosilicate glass-like layer ($Si_2O$, $B_2O_3$, and $M_2O$) are not distinct but are part of and, preferably, homogeneously distributed throughout the glass-like layer. That is, the silicate glass-like layer and the oxide layer compositions are described based on recognisable components (e.g. $SiO_2$, $B_2O_3$, $TiO_2$, $Cr_2O_3$ and $Ni_2O_3$) in the layers but consists of or comprise homogeneous compositions.

The aqueous silicate solution may have a specific gravity ranging from about 1.05 to about 1.30.

In some embodiments, the aqueous silicate solution may have a pH of from about 11 to about 13, for example, about 11 to about 12, or about 11.0 to about 11.5. In preferred embodiments, the aqueous silicate solution may have a pH of from about 10 to about 13, for example, about 10 to about 12, or about 10.0 to about 11.

In the metal product that results from the process of the invention, the glass-like layer is above the oxide layer. That glass-like layer can be a silicate glass-like or a borosilicate glass-like layer. For the purposes of this disclosure, a silicate glass-like layer is a polymerised silicate that results from the condensation polymerisation of a solution comprising a silicate, and a borosilicate glass-like layer is a polymerised silicate containing a boron source that results from the condensation polymerisation of the solution comprising a borosilicate.

The glass-like layer is derived from an aqueous solution of alkali metal silicate compounds that optionally contains a borate compound. Broadly, the aqueous solution is deposited on the metal surface, covering the metal oxide layer, heated to dry, cure, and polymerise the silicate-containing layer thereby forming a silicate glass-like or a borosilicate glass-like layer above the oxide. The silicate glass-like/borosilicate glass-like SEM/EDS composition consists of silicon, oxygen, sodium, optionally lithium, and optionally boron. The silicate glass-like layer composition is free of metal elements (other than silicon, sodium and/or lithium and optionally boron).

Preferably, the silicate glass-like layer has a composition (e.g. one determined by SEM/EDS, i.e. an SEM/EDS composition) that consists or consists essentially of silicon, oxygen, sodium, optionally lithium, and optionally boron. The silicate glass-like layer SEM/EDS data may show a trace amount of titanium, chromium, and other titanium alloy and stainless steel elements. Accordingly, the silicate glass-like layer may consist or consist essentially of silicon, oxygen, sodium, optionally lithium, and optionally boron, with trace amounts of other alloy elements possible.

The silicate glass-like layer can have a thickness of about 100 nm, 200 nm, 300 nm, 400 nm, 500 nm, 600 nm, 700 nm, 800 nm, 900 nm, 1000 nm, 1500 nm, 2000 nm, 2500 nm, 3000 nm, or 5000 nm. In some embodiments, the silicate glass-like layer thickness can be in the range of from about 100 nm to about 5000 nm (from about 0.1 μm to about 5 μm) or from about 100 nm to about 1000 nm (from about 0.1 μm to about 1 μm).

The silicate glass-like layer may have a composition that may include about 55% w/w to about 98% w/w $SiO_2$, about 0% w/w to about 6.7% w/w $B_2O_3$, and about 2.3% w/w to about 36% w/w $M_2O$, wherein M is selected from the group consisting of lithium, sodium, potassium, or a mixture thereof. M may preferably be is a mixture of Li and Na, for example, with a Li:Na ratio of about 1:10 to about 10:1. The selection and ratios of metals can significantly affect the weight percentages of the component parts. For example, in a composition wherein the molar ratio of the components is held constant, the variation of $M_2O$ from one hundred percent lithium, with an atomic mass of 6.941, to one hundred percent potassium, with an atomic mass of 39.098, causes a ten-fold change in the weight percentages.

The silicate glass-like layer may include less than about 0.1% w/w titanium, chromium, and other titanium alloy and stainless steel elements (excluding Si, Na, K and Li), preferably less than about 0.01% w/w titanium, chromium, and other titanium alloy and stainless steel elements (excluding Si, Na, K and Li), even more preferably less than about 0.001% w/w titanium, chromium, and other titanium alloy and stainless steel elements (excluding Si, Na, K and Li). In some embodiments, the silicate glass-like layer may include less than about 0.1% w/w metal alloy elements (excluding Si, Na, K and Li), preferably less than about 0.01% w/w metal alloy elements (excluding Si, Na, K and Li), even more preferably less than about 0.001% w/w metal alloy elements (excluding Si, Na, K and Li).

Optionally, the molar ratios of the components (expressed as percentages) are about 67% to about 81% $SiO_2$, 0% to about 7% $B_2O_3$, and about 17% to about 28% $M_2O$. Alternatively, the molar ratios can be about 75% to about 80% $SiO_2$, and about 20% to about 25% $M_2O$; or about 67% to about 76% $SiO_2$, about 3% to about 5% $B_2O_3$, and about 19% to about 30% $M_2O$. The silicate glass-like layer can have a composition which is the silicate glass-like layer composition as determined by SEM/EDS. Preferably, the silicate glass-like layer composition includes silicon, oxygen and sodium. More preferably, the silicate glass-like layer SEM/EDS composition consists or consists essentially of silicon, oxygen, and elements selected from the group consisting of sodium, lithium, potassium, boron, or mixtures thereof. In various aspects, the silicate glass-like layer SEM/EDS composition can consist or consist essentially of silicon, oxygen, sodium, and boron; silicon, oxygen, lithium, and boron; silicon, oxygen, sodium, and lithium; silicon, oxygen, sodium, lithium, and boron; or silicon, oxygen, sodium, lithium, potassium, and boron. In examples where the silicate glass-like composition (e.g. as determined by SEM/EDS or other methods) includes boron, the silicate glass is also described as a borosilicate glass. The silicate glass-like layer SEM/EDS composition can further be described as consisting or consisting essentially of silicon, oxygen, sodium, optionally lithium, and optionally boron. In some aspects, the silicate glass-like layer may be described as consisting or consisting essentially of silicon, oxygen, optionally boron, sodium, and optionally lithium but may include trace amounts of potassium due to materials employed for the production of the silicate glass-like layer having slight impurities. Notably, the silicate glass-like layer may, in fact, include hydrogen but hydrogen is not observable by SEM/EDS. More preferably, the silicate glass-like layer SEM/EDS composition is free of titanium/chromium/other titanium alloy and stainless steel elements (excluding Si, Na, K and Li).

When the silicate glass-like layer includes both sodium and lithium, the silicate glass-like layer may have a Na:Li atom ratio that is preferably about 1:9 to about 9:1. More preferably, the Na:Li atom ratio is about 1:5 to about 5:1; even more preferably, about 1:2.5 to about 2.5:1. When the silicate glass-like layer is a borosilicate glass-like layer, that is when the silicate glass-like layer includes boron, the silicate glass-like layer may have a Si:B atom ratio that is, preferably, about 10:1 to about 200:1. More preferably, the Si:B ratio is about 10:1 to about 100:1; even more preferably about 25:1 to about 100:1.

In another example, the silicate glass-like layer includes a mixture of alkali metals selected from a mixture of sodium and potassium; sodium, lithium and potassium; sodium and lithium; and lithium and potassium. That is, in this example the silicate glass-like layer includes a mixture of alkali metals wherein one alkali metal is potassium. Preferably, the silicate glass-like layer includes a non-homogenous distribution of potassium.

Preferably, the concentration of the silicon in the silicate glass-like layer is consistent across and through the layer. The consistency of the composition can be determined from the silicon concentration in the silicate glass-like layer SEM/EDS composition, preferably the silicon concentration varies by less than 5%, 4%, 3%, 2%, or 1% across and through the silicon glass-like layer. Additionally, the concentration of oxygen in the silicate glass-like layer is, preferably, consistent across and through the layer. That is, the oxygen concentration in the silicate glass-like layer SEM/EDS composition, preferably, varies by less than 5%, 4%, 3%, 2%, or 1% across and through the silicate glass-like layer.

The silicate glass-like layer is preferably a dense, impermeable layer. More preferably, the silicate glass-like layer is non-porous. Even more preferably, the silicate glass-like layer is a transparent, amorphous solid.

The aqueous silicate solution is contacted to the surface of the metal or metal alloy. The aqueous silicate solution can be contacted to the surface of the metal or metal alloy according to any suitable method. For example, the aqueous silicate solution may be contacted to the surface by immersion in the solution or application of the solution to the surface of the metal or metal alloy, for example, by spraying or roll coating.

Prior to application, the aqueous silicate solution may be maintained at a temperature from 5° C. to 45° C.

Curing

After the aqueous silicate solution is contacted to the surface of the metal or metal alloy, it is cured. Curing causes polymerisation and the formation of the silicate glass-like layer on to the oxide layer. The silicate glass-like layer and the oxide layer are bonded together in this process.

Curing can be achieved in a number of ways. In some embodiments, curing is achieved by heating. In one example, the heating of the coated metal having an oxide layer facilitates the removal of water from the coating, dehydration-polymerisation of $SiO_2$ groups, and the curing of the silicate glass-like layer. For example, the process can include heating to a temperature of about 200° C. to about 500° C. The polymerisation and curing temperature can be in the range of about 200° C. to about 500° C., preferably this temperature is about 200° C. to about 400° C., about 230° C. to about 320° C., about 250° C. to about 350° C., about 260° C. to about 325° C., or about 260° C. to about 300° C. More preferably, the polymerising and curing of the silicate glass-like layer includes heating the surface of the substrate, i.e. the coated, oxide layer, to a temperature of about 240° C. to about 320° C., about 260° C. to about 300° C., about 270° C. to about 290° C., or about 280° C. It was unexpectedly noticed that a coated article exposed to a temperature above 230° C. presents superior water-repellent properties. Therefore, in some embodiments, the methods comprise heating the coated, passive layer to a temperature of at least 230° C. However, any temperature from about 200° C. to about 500° C. may be suitable to obtain an anticorrosive coating.

The polymerisation and curing of the silicate glass-like layer preferably includes the rapid heating and dehydration of the aqueous alkali metal silicate. In one preferable example, the polymerisation and curing of the silicate glass-like layer includes the heating of the silicate layer (solution/glass) but incomplete heating of the underlying substrate. The heating and dehydration of the aqueous silicate solution carried on the surface of the oxide layer can be accomplished by, for example, direct heating in an oven, heating by lamps, a vacuum process, or a combination thereof. In one preferable example, the oxide layer is heated in an oven. In one instance, the oxide layer is heated in a conventional oven. In another instance, the oxide layer is heated in a convection oven that allows for the more rapid and even elevation of the temperature of the oxide layer. In yet another instance, the oxide layer is carried through a heating zone (e.g. in a conveyor oven).

In some embodiments, the oxide is heated to the polymerisation and curing temperature at a rate of at least 20° C./s, is heated for a heating time of less than about 30 min, and is then removed from the heat source to a temperature of less than 50° C., preferably removed from the heat source to room temperature.

In some embodiments, the heating is for a heating time of less than about 5 min, less than about 10 min, less than about 15 min, less than about 20 min, less than about 25 min, or less than about 30 min. Preferably, the heating time is less than about 15 min.

In another example, the silicate glass-like layer can be formed by the infrared activation of the alkali metal silicate layer carried on the surface of the oxide layer. For example, the coated, oxide layer can be polymerised and the silicate glass-like layer cured by exposing the oxide layer to an infrared (IR) source. In one instance, the oxide layer is exposed to IR heat lamps (e.g. short-wave or mid-wave lamps). In another instance, the oxide layer is carried through an IR exposure region (e.g. on a conveyor). The IR transmission from the IR source can be from about 1 μm to about 3 μm (short-wave IR), from about 3 μm to about 5 μm (mid-wave IR, or intermediate IR), or from about 2 μm to about 4 μm (IR-B). Preferably, the IR exposure is for an exposure time of less than about 15 s, 30 s, 45 s, 60 s, 90 s, 120 s, 3 min, 4 min, 5 min, or 10 min.

The cured, silicate glass-like layer is resistant to the well-known changes in surface colour following exposure to high temperatures. Whereas uncoated oxide layers, for example, titanium dioxide/chromium oxide layers, change colour in high temperatures according to the changing thickness of the oxide layer (see FIG. 1.). The coated oxide layer of the invention can be exposed to the IR source and the resultant cured silicate glass-like layer appears as a uniform unbroken surface without discolouration.

Herein, the products carrying the cured silicate glass pass the "CASS Test", the "Water Resistance of Coatings Using Water Immersion Test", the "Water Resistance of Coatings in 100% Relative Humidity Test", the "Adhesion by Tape Test", the "Evaluating Coatings for High Temperature Service Test", the "Open Flame Test". Water-repellent properties were evaluated in accordance to the "Standard Practice for Surface Wettability of Coatings, Substrates and Pigments by Advancing Contact Angle Measurement".

After curing, the method may comprise removing the excess aqueous silicate solution from the metal (for example by washing) after the appropriate period of time has elapsed. Alternatively, the substrate can simply be withdrawn from the aqueous silicate solution if it has been immersed in it (followed by optional washing to remove excess solution).

Reduction of Silicate Solution Penetration into an Oxide Layer

In some embodiments, the coating process, excludes the formation of silicate, for example, titanium silicates and/or chromium silicate (depending on the underlying metal being used). In some embodiments, the process does not include the formation of silicates. In one example, preventing the formation of the silicates includes preventing the dissolution of metal from the oxide layer into the aqueous silicate solution. For example, the coating process may prevent the diffusion of the silicate into the oxide and/or the interdiffusion of the silicate and oxide thereby providing a product that is free of silicate (for example, a titanium silicate, chromium silicate, or silicate-titanium/chromium/other alloy elements) interdiffusion. Processes for preventing the penetration of the aqueous silicate solution into the oxide layer can include rapidly drying the aqueous silicate solution to reduce or eliminate the mobility of the silicon atoms.

In one example, the process can include preheating the metal or metal alloy substrate to a temperature of about 30° C. to about 100° C. immediately after the formation of the oxide layer created by passivation. In another example, the process can include drying the metal or metal alloy substrate immediately after the formation of the oxide layer created by passivation. In another example, the process can include reducing the water content in the oxide layer created by passivation by at least about 25%, at least about 50%, or at least about 75% immediately after the formation of the oxide layer.

The methods of the invention, preferably, includes quickly applying the aqueous silicate solution to the oxide layer. For example, the process can include applying the aqueous silicate solution within about 48 hours (for example, within about 24 hours) of the initiation of the step of exposing the metal or metal alloy to a gaseous oxidising environment (e.g. air) to generate a new oxide layer. In other words, the methods may comprise exposing the metal or metal alloy to a gaseous oxidising environment (e.g. air) for a maximum of up to about 48 hours (for example up to about 24 hours). In embodiments comprising a step of chemical passivation, the process can include applying the aqueous silicate solution within about 1 hour of completing the step of chemical passivation. That is, the process can include immersing the metal or metal alloy having the oxide layer created by chemical passivation in the aqueous silicate solution; or applying the aqueous silicate solution (for example, by spray coating or roll coating) within about 1 hour of a conclusion of the chemical passivation process. In some embodiments comprising a chemical passivation step, the process can include exposing the chemically passivated metal or metal alloy to a gaseous oxidising environment (e.g. air) for up about 1 hour before immersing the metal or metal alloy having the oxide layer created by chemical passivation in the aqueous silicate solution; or before applying the aqueous silicate solution to the metal or metal alloy (for example, by spray coating or roll coating). In some embodiments comprising both a pickling step and a chemical passivation step, the process can include exposing the pickled metal or metal alloy to a gaseous oxidising environment (e.g. air) for up about 1 hour before the step of chemical passivation, and exposing the chemically passivated metal or metal alloy to a gaseous oxidising environment (e.g. air) for up about 1 hour before immersing the metal or metal alloy having the oxide layer created by chemical passivation in the aqueous silicate solution; or before applying the aqueous silicate solution to the metal or metal alloy (for example, by spray coating or roll coating).

The coated, oxide layer includes an aqueous solution of an alkali metal silicate carried on the surface of titanium dioxide/chromium oxide. Without being bound to theory, the dried, coated, oxide layer can include sufficient amount of water to allow for the dissolution of the alkali metal silicate from the titanium dioxide/chromium oxide layer. That is, prior to a polymerisation and curing step, the alkali metal silicate carried on the surface of the titanium dioxide/chromium oxide layer can be dissolved or removed from the surface by, for example, washing the surface in an alkali solution (e.g. 0.01 M NaOH or 0.1 M NaOH) or an acid solution (e.g. 2% v/v HF).

Sealing

Methods described herein may comprise a step of sealing. The step of sealing may occur prior to the step of applying the aqueous silicate solution, for example, between the step of forming an oxide layer by passivation (such as by chemical passivation) and applying the aqueous silicate solution. Sealing may be of particular use when the underlying substrate is aluminium or an aluminium alloy. Sealing may provide a sealed layer, for example, a sealed oxidised-aluminium layer. The sealing step can include a sealing time of less than about 6 min/μm, less than about 5 min/μm, less than about 4 min/μm, less than about 3 min/μm, less than about 2 min/μm, less than about 1 min/μm, less than about 30 s/μm, or less than about 10 s/μm. Sealing may be conducted at specific temperatures. The sealing process can, therefore, include hot sealing, warm sealing and cold sealing. Hot sealing may be preferred. Cold sealing may occur from about 25° C. to about 30° C. Warm sealing (or mid-temperature sealing) may occur at about 60° C. to about 80° C. Hot sealing may occur at a temperature of at least about 80° C.

In one embodiment, the oxide layer is exposed to an aqueous solution (e.g. water) at a temperature of at least about 85° C. That is, the process can include forming a sealed layer by a hot sealing process. The hot sealing process includes exposing the metal or metal alloy having the oxide layer applied by chemical passivation to water at a temperature of at least 85° C., 90° C., 95° C., 98° C., 99° C., 100° C., or 101° C. In one instance, the metal can be hot sealed in boiling or near boiling water; in another instance, the metal can be steam sealed. Preferably, metal is hot sealed in boiling or near boiling water. The hot sealing of the metal can include exposing the metal to hot water for at least 5 min/μm, 4 min/μm, 3 min/μm, 2 min/μm, 1 min/μm, 30 s/μm, or 10 s/μm. The process can, alternatively, include exposing a PVD alumina layer to water at a temperature of at least 85° C., 90° C., 95° C., 98° C., 99° C., 100° C., or 101° C. to form a hydrated PVD alumina.

When using aluminium in the metal substrate, the hot sealing process may include forming aluminium hydroxides on the exposed surface of the aluminium oxide layer during the exposure of the materials to water at a temperature of at least 85° C. Optionally, the process can include forming aluminium hydroxides within the aluminium oxide layer. Optionally, the process includes forming a boehmite/bayerite region in the aluminium oxide layer.

Still further, the process can include a time between the conclusion of the hot sealing process and forming the coated, oxidised-aluminium layer of less than 60, 45, 40, 35, 30, 25, 20, 15, 10, or 5 minutes. Preferably, the time is less than about 5 minutes or is no more than the amount of time necessary to remove the sample from a hot sealing bath or apparatus, cool to about room temperature, and then immerse in the aqueous silicate solution (in practice, often less than about 1 minute). In another instance, the sealed layer may be held in a wet atmosphere, in water, or coated with water; before applying the aqueous silicate solution.

Methods disclosed herein may comprise quickly applying the aqueous silicate solution to the metal oxide layer after hot sealing (e.g. exposing the metal oxide layer to hot water). For example, the process can include forming a coated, passive-metal layer by applying the aqueous silicate solution within 45, 40, 35, 30, 25, 20, 15, 10, or 5 minutes of the conclusion of the hot sealing process. That is, the process can include immersing the sealed, passive-metal layer in the aqueous silicate solution; or spray coating or roll coating the sealed, passive-metal layer with the aqueous silicate solution within 45, 40, 35, 30, 25, 20, 15, 10, or 5 minutes of a conclusion of the hot sealing process. In another example, the process can include applying the aqueous silicate solution within 45, 40, 35, 30, 25, 20, 15, 10, or 5 minutes of removal from exposure to water at a temperature of at least about 85° C.

Alternatively, the process can include holding or maintaining the hot sealed metal oxide layer in an atmosphere with a relative humidity of at least 50%, 60%, 70%, 80%, 90%, or about 100% prior to coating the metal oxide layer with the aqueous silicate solution. In another example, the process can include holding or maintaining the hot water exposed metal oxide layer in water and then coating with an aqueous silicate solution.

Preferably, the metal oxide layer is held in water at a temperature of less than 75° C., 65° C., 60° C., 55° C., 50° C., 45° C., 40° C., 35° C., 30° C., 25° C., or 20° C. For example, the process can include holding, maintaining, or submerging the sealed, passive metal layer in water; and then forming the coated, passive metal layer by applying the aqueous silicate solution.

In another specific example, the process can consist of hot sealing a passive metal layer by exposing the metal oxide layer to water at a temperature of at least 85° C., 95° C., or 100° C. The process thereafter includes either (A) forming a coated, passive metal layer by dip coating, spray coating, or roll coating the sealed, passive metal layer with an aqueous silicate solution within 20, 15, 10, or 5 minutes of a conclusion of the hot sealing process, or (B) maintaining the sealed, passive metal layer in water after the hot sealing process and then forming the coated, passive metal layer by dip coating, spray coating, or roll coating with the aqueous silicate solution.

Thereafter, the process includes polymerising and curing the coated, passive metal layer to form a non-porous silicate glass-like layer, the polymerising and curing includes heating the coated, passive metal layer to a temperature of from about 225° C. to about 300° C., for example, from about 230° C. to about 300° C.

Barrier Layer

In some embodiments, in particular for those using an aluminium substrate (and hence an aluminium oxide layer), there may a barrier layer disposed between the metal/metal alloy and the oxide layer. This barrier layer is directly attached to an oxide layer which is directly attached to a silicate glass-like layer. Herein, directly attached signifies and means that the denoted layers are chemically and/or physically bonded without an intervening layer. This absence of an intervening layer can be determined by spectroscopic and/or microscopic methods, for example, energy-dispersive X-ray spectroscopy (EDS), time-of-flight secondary ion mass spectroscopy (TOF-SIMS), and/or scanning electron microscopy (SEM). Preferably, the barrier layer has a composition (for example, one determined by TOF-SIMS, i.e. a TOF-SIMS composition) that includes aluminium and oxygen. In some examples, the barrier layer TOF-SIMS composition further includes sodium and/or lithium. In still further examples, the barrier layer TOF-SIMS composition may include trace amounts of silicon. Notably, a friability of the barrier layer imparts a sharp increase in the number of counts in the TOF-SIMS analysis.

However, barrier layers are optional. In one embodiment, the coated product includes a substrate carrying an oxide layer that is directly attached to a silicate glass-like layer. Here, the coated product can be free of a barrier layer, e.g. the oxide layer can be directly attached to the substrate.

Various Methods of the Invention

The methods of the invention may include a number of different combinations of certain features, for example, (but not limited to) those below.

For example, embodiments comprising steps of pickling and chemical passivation may comprise the following.

In one embodiment, the method comprises or consists of:

cleaning the surface of the metal or metal alloy;

removing an existing oxide layer from the metal or metal alloy by pickling using an acidic pickling solution comprising nitric acid and hydrofluoric acid having a pH of 1;

forming an oxide layer on the surface of the metal or metal alloy using a chemical passivating solution comprising nitric acid or citric acid and having a pH of 1;

applying a coating of an aqueous silicate solution to the metal or metal alloy oxide, wherein the aqueous silicate solution has a pH of from 10 to 13 (for example, 11 to 13), that comprises $SiO_2$, $M_2O$, and optionally $B_2O_3$, wherein M is selected from Li, Na, K, or a mixture thereof, and has a ratio of $SiO_2$ to $M_2O$ of from about 3.8 to about 2 and, if $B_2O_3$ is present, a ratio of $SiO_2$ to $B_2O_3$ of from about 10:1 to about 200:1; and curing the applied coating on the oxide layer to provide a silicate coating layer by;

heating the coated, passive layer to a temperature of at least 200° C.; or exposing the coated, passive layer to an infrared source.

In one embodiment, the method comprises or consists of:

cleaning the surface of the metal or metal alloy;

removing an existing oxide layer from the metal or metal alloy by pickling using an acidic pickling solution comprising nitric acid and hydrofluoric acid having a pH of 1;

forming an oxide layer on the surface of the metal or metal alloy using a chemical passivating solution comprising nitric acid or citric acid and having a pH of 1;

applying a coating of an aqueous silicate solution to the metal or metal alloy oxide, wherein the aqueous silicate solution has a pH of from 10 to 13 (for example, 11 to 13), that comprises $SiO_2$, $M_2O$, and optionally $B_2O_3$, wherein M is selected from Li, Na, K, or a mixture thereof, and has a ratio of $SiO_2$ to $M_2O$ of from about 3.8 to about 2 and, if $B_2O_3$ is present, a ratio of $SiO_2$ to $B_2O_3$ of from about 10:1 to about 200:1; and curing the applied coating on the oxide layer to provide a silicate coating layer by;

heating the coated, passive layer to a temperature of at least 230° C.; or exposing the coated, passive layer to an infrared source.

In one embodiment, the method comprises or consists of:

cleaning the surface of the metal or metal alloy;

removing an existing oxide layer from the metal or metal alloy by pickling using an acidic pickling solution comprising nitric acid and hydrofluoric acid having a pH of 1;

forming an oxide layer on the surface of the metal or metal alloy using a chemical passivating solution comprising nitric acid or citric acid and having a pH of 1;

applying a coating of an aqueous silicate solution to the metal or metal alloy oxide, wherein the aqueous silicate solution has a pH of from 10 to 13 (for example, 11 to 13), that comprises $SiO_2$, $M_2O$, and $B_2O_3$, wherein M is selected from Li, Na, K, or a mixture thereof, and has a ratio of $SiO_2$ to $M_2O$ of from about 3.8 to about 2 and a ratio of $SiO_2$ to $B_2O_3$ of from about 10:1 to about 200:1; and curing the applied coating on the oxide layer to provide a silicate coating layer by;

heating the coated, passive layer to a temperature of at least 200° C.; or exposing the coated, passive layer to an infrared source.

In one embodiment, the method comprises or consists of:

cleaning the surface of the metal or metal alloy;

removing an existing oxide layer from the metal or metal alloy by pickling using an acidic pickling solution comprising nitric acid and hydrofluoric acid having a pH of 1;

forming an oxide layer on the surface of the metal or metal alloy using a chemical passivating solution comprising nitric acid or citric acid and having a pH of 1;

applying a coating of an aqueous silicate solution to the metal or metal alloy oxide, wherein the aqueous silicate solution has a pH of from 10 to 13 (for example, 11 to 13), that comprises $SiO_2$, $M_2O$, and $B_2O_3$, wherein M is selected from Li, Na, K, or a mixture thereof, and has a ratio of $SiO_2$ to $M_2O$ of from about 3.8 to about 2 and a ratio of $SiO_2$ to $B_2O_3$ of from about 10:1 to about 200:1; and curing the applied coating on the oxide layer to provide a silicate coating layer by;

heating the coated, passive layer to a temperature of at least 230° C.; or exposing the coated, passive layer to an infrared source.

In some embodiments, the pickling solution comprises 10-20% v/v (150 g/L-300 g/L) of 70% nitric acid and from 1% to 2% v/v (12 g/L-24 g/L) of 60% hydrofluoric acid.

The passivating solution may comprise about 15% to about 30% v/v of 70% nitric acid, passivation may be conducted for at least about 20 minutes, and passivation may be conducted at a temperature of from about 15° C. to about 60° C. Alternatively, the passivation is conducted using a passivating solution comprising about 1% to about 15% w/v of citric acid, may be conducted for at least about 4 minutes and may be conducted at a temperature of from about 20° C. to about 70° C.

The above embodiments may comprise exposing the metal or metal alloy to a gaseous oxidising environment (e.g. air) for up to about 48 hours (for example up to about 24 hours). In some embodiments, the methods comprise exposing the metal or metal alloy to a gaseous oxidising environment (e.g. air) for up to about 1 hour between the steps of pickling and chemical passivation, and for up to about 1 hour between the steps of chemical passivation and applying the coating.

For example, embodiments comprising a step of removing the existing oxide layer by abrasive blasting may comprise the following.

In some embodiments, the methods comprise or consist of the steps of:

providing a metal or metal alloy substrate comprising an oxide layer;

removing the existing oxide layer from the metal or metal alloy by abrasive blasting;

washing the blasted metal or metal alloy;

exposing the metal or metal alloy to a gaseous oxidising environment (e.g. air) for up to 48 hours (preferably up to 24 hours) to form a new oxide layer on the surface of the metal or metal alloy.

applying a coating of an aqueous silicate solution to the new metal or metal alloy oxide layer;

curing the applied coating on the new oxide layer to provide a silicate coating layer by:

heating the coating to a temperature of at least 200° C.; or exposing the coating to an infrared source.

In some embodiments, the methods comprise or consist of the steps of:

providing a metal or metal alloy substrate comprising an oxide layer;

removing the existing oxide layer from the metal or metal alloy by abrasive blasting;

washing the blasted metal or metal alloy;

exposing the metal or metal alloy to a gaseous oxidising environment (e.g. air) for up to 48 hours (preferably up to 24 hours) to form a new oxide layer on the surface of the metal or metal alloy.

applying a coating of an aqueous silicate solution to the new metal or metal alloy oxide layer;

curing the applied coating on the new oxide layer to provide a silicate coating layer by:

heating the coating to a temperature of at least 230° C.; or exposing the coating to an infrared source.

In some embodiments, the methods comprise or consist of the steps of:

providing a metal or metal alloy substrate comprising an oxide layer;

removing the existing oxide layer from the metal or metal alloy by abrasive blasting;

washing the blasted metal or metal alloy;

exposing the metal or metal alloy to a gaseous oxidising environment (e.g. air) for up to 48 hours (preferably up to 24 hours) to form a new oxide layer on the surface of the metal or metal alloy;

applying a coating of an aqueous silicate solution to the new metal or metal alloy oxide layer, wherein the aqueous silicate solution has a pH of from 10 to 13, that comprises $SiO_2$ and $M_2O$ and optionally $B_2O_3$, wherein M is selected from Li, Na, K, or a mixture thereof, and has a ratio of $SiO_2$ to $M_2O$ of from about 3.8 to about 2 and, if $B_2O_3$ is present, a ratio of $SiO_2$ to $B_2O_3$ of from about 10:1 to about 200:1;

curing the applied coating on the new oxide layer to provide a silicate coating layer by:

heating the coating to a temperature of at least 200° C.; or exposing the coating to an infrared source.

In some embodiments, the methods comprise or consist of the steps of:

providing a metal or metal alloy substrate comprising an oxide layer;

removing the existing oxide layer from the metal or metal alloy by abrasive blasting;

washing the blasted metal or metal alloy;

exposing the metal or metal alloy to a gaseous oxidising environment (e.g. air) for up to 48 hours (preferably up to 24 hours) to form a new oxide layer on the surface of the metal or metal alloy;

applying a coating of an aqueous silicate solution to the new metal or metal alloy oxide layer, wherein the aqueous silicate solution has a pH of from 10 to 13, that comprises $SiO_2$ and $M_2O$ and optionally $B_2O_3$, wherein M is selected from Li, Na, K, or a mixture thereof, and has a ratio of $SiO_2$ to $M_2O$ of from about 3.8 to about 2 and, if $B_2O_3$ is present, a ratio of $SiO_2$ to $B_2O_3$ of from about 10:1 to about 200:1;

curing the applied coating on the new oxide layer to provide a silicate coating layer by:

heating the coating to a temperature of at least 230° C.; or exposing the coating to an infrared source.

In some embodiments, the methods comprise or consist of the steps of:

providing a metal or metal alloy substrate comprising an oxide layer;

removing the existing oxide layer from the metal or metal alloy by abrasive blasting;

washing the blasted metal or metal alloy;

exposing the metal or metal alloy to a gaseous oxidising environment (e.g. air) for up to 48 hours (preferably up to 24 hours) at room temperature to form a new oxide layer on the surface of the metal or metal alloy;

applying a coating of an aqueous silicate solution to the new metal or metal alloy oxide layer, wherein the aqueous silicate solution has a pH of from 10 to 13, that comprises $SiO_2$ and $M_2O$ and optionally $B_2O_3$, wherein M is selected from Li, Na, K, or a mixture thereof, and has a ratio of $SiO_2$ to $M_2O$ of from about 3.8 to about 2 and, if $B_2O_3$ is present, a ratio of $SiO_2$ to $B_2O_3$ of from about 10:1 to about 200:1;

curing the applied coating on the new oxide layer to provide a silicate coating layer by:

heating the coating to a temperature of at least 200° C.; or exposing the coating to an infrared source.

In some embodiments, the methods comprise or consist of the steps of:

providing a metal or metal alloy substrate comprising an oxide layer;

removing the existing oxide layer from the metal or metal alloy by abrasive blasting;

washing the blasted metal or metal alloy;

exposing the metal or metal alloy to air for up to 48 hours (preferably up to 24 hours) at room temperature to form a new oxide layer on the surface of the metal or metal alloy;

applying a coating of an aqueous silicate solution to the new metal or metal alloy oxide layer, wherein the aqueous silicate solution has a pH of from 10 to 13, that comprises $SiO_2$ and $M_2O$ and optionally $B_2O_3$, wherein M is selected from Li, Na, K, or a mixture thereof, and has a ratio of $SiO_2$ to $M_2O$ of from about 3.8 to about 2 and, if $B_2O_3$ is present, a ratio of $SiO_2$ to $B_2O_3$ of from about 10:1 to about 200:1;

curing the applied coating on the new oxide layer to provide a silicate coating layer by:

heating the coating to a temperature of at least 230° C.; or exposing the coating to an infrared source.

In some embodiments, the methods comprise or consist of the steps of:

- providing a metal or metal alloy substrate comprising an oxide layer;
- completely removing the existing oxide layer from the metal or metal alloy by abrasive blasting using an abrasive agent (for example, sand);
- washing the blasted metal or metal alloy to remove the abrasive agent;
- exposing the metal or metal alloy to a gaseous oxidising environment (e.g. air) for up to 48 hours (preferably up to 24 hours) at room temperature to form a new oxide layer on the surface of the metal or metal alloy, wherein the time period of up to 48 hours (preferably up to 24 hours) begins on initiation of the step of abrasive blasting;
- applying a coating of an aqueous silicate solution to the new metal or metal alloy oxide layer, wherein the aqueous silicate solution has a pH of from 10 to 13, that comprises $SiO_2$ and $M_2O$ and optionally $B_2O_3$, wherein M is selected from Li, Na, K, or a mixture thereof, and has a ratio of $SiO_2$ to $M_2O$ of from about 3.8 to about 2 and, if $B_2O_3$ is present, a ratio of $SiO_2$ to $B_2O_3$ of from about 10:1 to about 200:1;
- curing the applied coating on the new oxide layer to provide a silicate coating layer by:
  - heating the coating to a temperature of at least 200° C.; or
  - exposing the coating to an infrared source.

In some embodiments, the methods comprise or consist of the steps of:

- providing a metal or metal alloy substrate comprising an oxide layer;
- completely removing the existing oxide layer from the metal or metal alloy by abrasive blasting using an abrasive agent (for example, sand);
- washing the blasted metal or metal alloy to remove the abrasive agent;
- exposing the metal or metal alloy to a gaseous oxidising environment (e.g. air) for up to 48 hours (preferably up to 24 hours) at room temperature to form a new oxide layer on the surface of the metal or metal alloy, wherein the time period of up to 48 hours (preferably up to 24 hours) begins on initiation of the step of abrasive blasting;
- applying a coating of an aqueous silicate solution to the new metal or metal alloy oxide layer, wherein the aqueous silicate solution has a pH of from 10 to 13, that comprises $SiO_2$ and $M_2O$ and optionally $B_2O_3$, wherein M is selected from Li, Na, K, or a mixture thereof, and has a ratio of $SiO_2$ to $M_2O$ of from about 3.8 to about 2 and, if $B_2O_3$ is present, a ratio of $SiO_2$ to $B_2O_3$ of from about 10:1 to about 200:1;
- curing the applied coating on the new oxide layer to provide a silicate coating layer by:
  - heating the coating to a temperature of at least 230° C.; or
  - exposing the coating to an infrared source.

When the methods of the invention are conducted on aluminium or an aluminium alloy, they may be a further step of sealing, as discussed elsewhere.

The processes of the invention will generally be carried out in air or in an atmosphere comprising oxygen. In “air” refers to carrying out the processes in an environment comprising air, i.e. not in a protective or controlled atmosphere, but instead in the Earth’s atmosphere, for example, at about 1 atmospheric pressure.

Properties of the Coated Products

The metal products of this disclosure have numerous advantages over the prior art products. For example, the transparent coating formed by the glass-like layer-oxide combination allows the metal surface to show through, and does not affect the inherent photometric characteristics of the underlying metal. The inherent photometric characteristics of that surface can include any photometric characteristic desired in the surface including but not limited to, for example, reflectance, brightness, clarity, colour, surface textures etc. In one embodiment, the total reflectance can be greater than about 75%, preferably greater than about 80%, and more preferably greater than about 85%. Alternatively, the loss in reflectance between the underlying metal and the disclosed metal product with the metal-metal oxide-glass layer can be less than about 2%, preferably less than about 1%, more preferably less than about 0.5%. The ability of the metal product to reflect light is primarily limited to the amount of oxide present on the surface of the metal, as the glass-like layer atop that oxide layer is largely transparent.

The metal products obtained according to methods described herein display temperature oxidation, corrosion, and degradation resistance. Generally, the resistance to temperature oxidation, corrosion or degradation is determined by the performance of test samples in standardised test methods. Therein, samples are evaluated on a “pass/fail scale”. Typically, passing a specific test is indicated by no change in visual appearance at the conclusion of the test whereas failure of a specific test was indicated by significant colour change (due to high temperature oxidation), corrosion, or degradation of the sample.

Some tests provided less binary results; in these circumstances samples were additionally graded on a “F/P(−)/P” scale: where “F” equates to failure, “P(−)” equates with a minor change in appearance (e.g. light discolouration, spotting, or clouding over less than 10% of the coated surface area), and “P” equates with no change in visual appearance. Herein, samples that exhibit no visual change in appearance (score a “P”) are considered to have “excelled” at the test.

Figure 2:
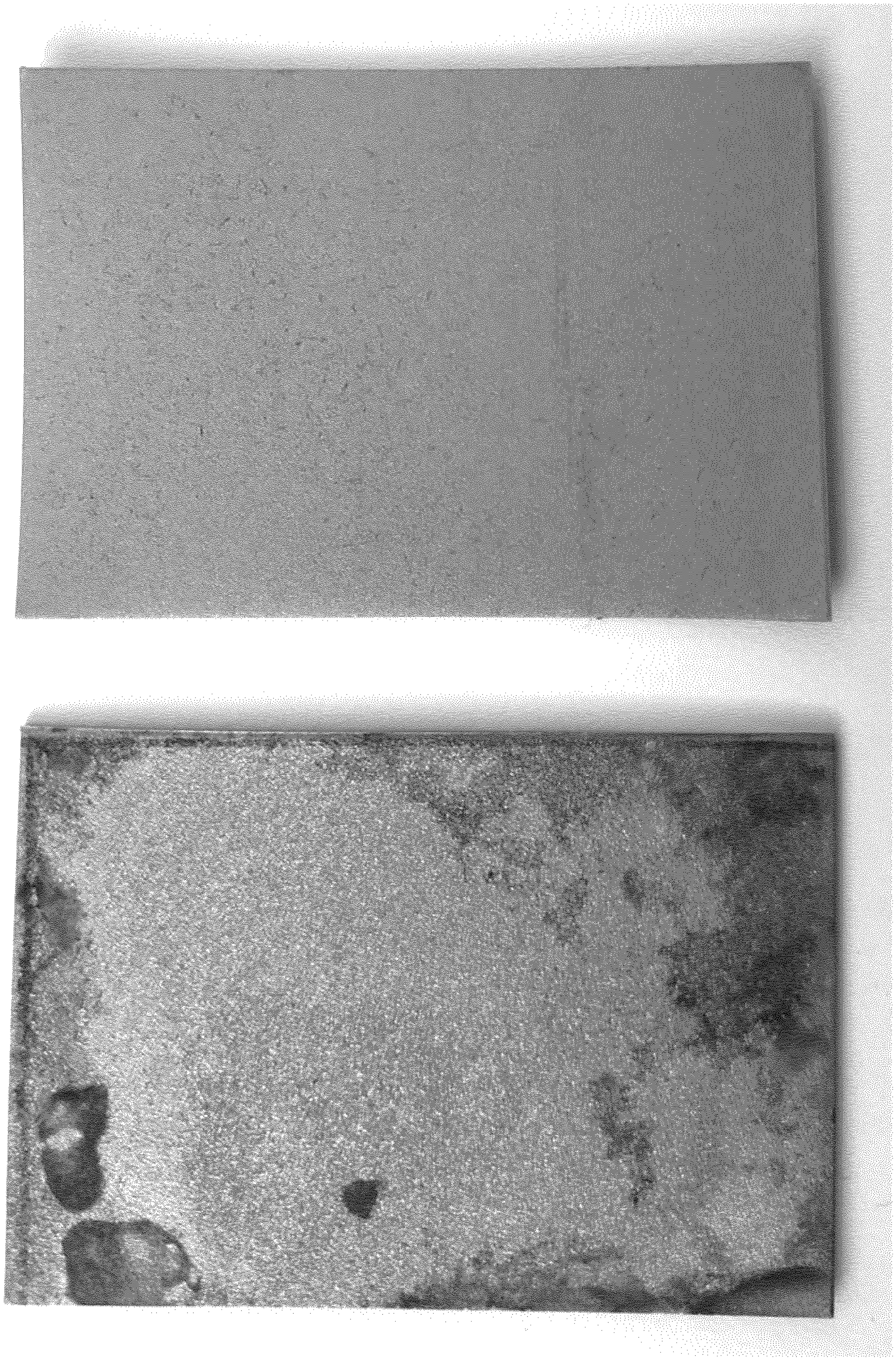
FIG. 2—A photograph of two metal plates (stainless steel) subjected to 48 h CASS Test. On the left— sample without silicate glass-like layer (sample SS 11). On the right—sample with silicate glass-like layer (sample SS 5).

In a first instance, the herein described coating provides the coated materials with resistance to a Copper Accelerated Acetic Acid Salt Spray (fog) (CASS) Test. Preferably, the coated product passes a 24 hours CASS Test, and 48 hours CASS Test. The CASS Test is a known industry standard, e.g. ASTM B368-09(2009): Standard Test Method for Copper-Accelerated Acetic Acid-Salt Spray (Fog) Testing (CASS Test), American Society for Testing and Materials (ASTM International). Typical failure under the CASS Test is pinhole corrosion. Accordingly, samples were evaluated on a pass/fail basis, wherein samples that exhibited pinhole corrosion failed whereas samples that maintained their integrity passed. In limited samples, slight changes in visual appearance were observed; these samples were graded to “-” which equates with a minor change in appearance. Preferably, samples exhibited no change in visual appearance as a result of the CASS Test; these samples are considered to have “excelled” under the test conditions. Additionally, preferred samples exhibited no change in visual appearance as a result of an Extended CASS Test (48 hours) (see FIG. 2.).

In a second instance, the herein described coated product passes, an Evaluating Coatings for High Temperature Service Test. This is a known industry standard, e.g. ASTM D2485-18(2018): Standard Test Methods for Evaluating Coatings For High Temperature Service, method B, American Society for Testing and Materials (ASTM International). Preferably, the coated product passes the Evaluating Coatings for High Temperature Service Test at the exposure to 400° F. (204° C.) for 16 hours, 500° F. (260° C.) for 8 hours; 600° F. (315° C.) for 16 hours, 700° F. (371° C.) for 8 hours. Samples were visually inspected for evidence of failure after the last heat exposure. Typical failure under the Evaluating Coatings for High Temperature Service Test is discolouration (caused by high temperature oxidation). Accordingly, samples were evaluated on a pass/fail basis, wherein samples that exhibited colour changes failed whereas samples that maintained their integrity passed. Preferably, samples exhibited no change in visual appearance as a result of the Evaluating Coatings for High Temperature Service Test; these samples are considered to have "excelled" under the test conditions (see FIG. 1.).

In another instance, the herein described coated product passes a Measuring Adhesion by Tape Test. This is a known industry standard, e.g. ASTM D3359-09(2009): Standard Test Methods for Measuring Adhesion by Tape Test, method B, American Society for Testing and Materials (ASTM International). Preferably, the coated product passes the Measuring Adhesion by Tape Test. Typical failure under the Measuring Adhesion by Tape Test is the removal of coating from the substrate. Accordingly, samples were evaluated on a pass/fail basis, wherein samples that exhibited removal of coating from substrate failed whereas samples that maintained their integrity passed. Preferably, samples exhibited no change in visual appearance as a result of the Measuring Adhesion by Tape Test; these samples are considered to have "excelled" under the test conditions.

In still yet another instance, the herein described coating provides a Water Resistance of Coating in 100% Relative Humidity. This is a known industry standard, e.g. ASTM D2247-02(2002): Standard Practice for Testing Water Resistance of Coatings in 100% Relative Humidity, American Society for Testing and Materials (ASTM International). Preferably, the coated product passes exposure to constant humidity condensation atmosphere at 38° C.±2° C. in five 24 hours cycles with 24 hours recovery period. Typical failure parameters under the Water Resistance of Coating in 100% Relative Humidity Test is an effects such as colour change, blistering, loss of adhesion, softening, or embrittlement. Accordingly, samples were evaluated on a pass/fail basis, wherein samples that exhibited any sign of failure failed whereas samples that maintained their integrity passed. Preferably, samples exhibited no change in visual appearance as a result of the Water Resistance of Coating in 100% Relative Humidity Test; these samples are considered to have "excelled" under the test conditions.

Figure 3:
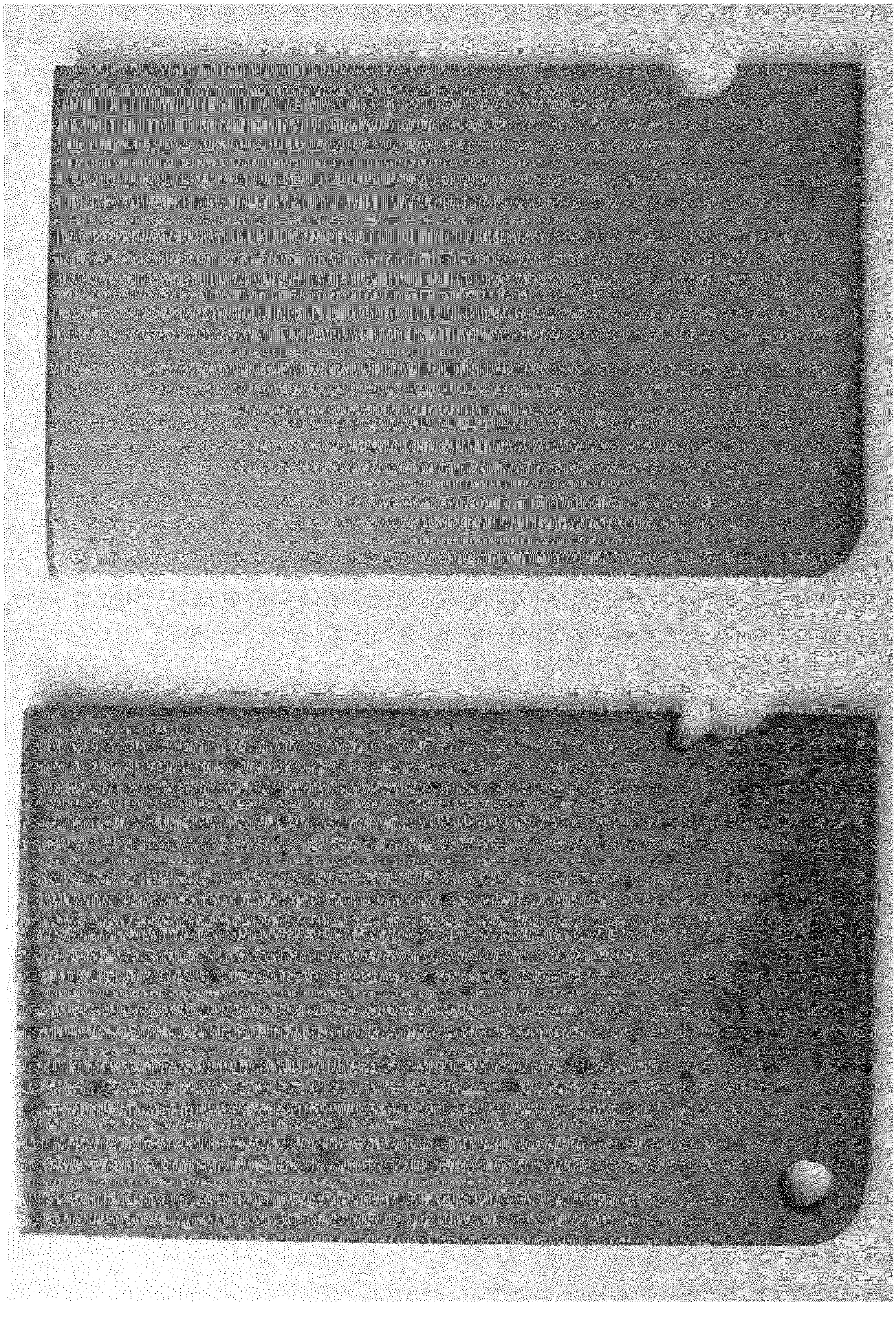
FIG. 3—A photograph of two metal plates (titanium alloy) subjected to Water Resistance of Coatings Using Water Immersion Test. On the left—sample without silicate glass-like layer (sample Ti 7). On the right—sample with silicate glass-like layer (sample Ti 4).

In another instance, the herein described coating provides a Water Resistance of Coatings Using Water Immersion. This is a known industry standard, e.g. ASTM D870-02 (2002): Standard Practice for Testing Water Resistance of Coatings Using Water Immersion, American Society for Testing and Materials (ASTM International). Preferably, the coated product passes the immersion in water for 200 hours at a temperature of 95° C.±5° C. Typical failure under the Water Resistance of Coatings Using Water Immersion Test is any effects such as colour change, blistering, loss of adhesion, softening, or embrittlement. Accordingly, samples were evaluated on a pass/fail basis, wherein samples that exhibited any sign of failure failed whereas samples that maintained their integrity passed. Preferably, samples exhibited no change in visual appearance as a result of the Water Resistance of Coatings Using Water Immersion Test; these samples are considered to have "excelled" under the test conditions (see FIG. 3.).

Figure 4:
FIG. 4—A photograph of one metal plate (titanium alloy) subjected to "Open Flame Test". In the upper left corner of the sample surface—area without silicate glass-like layer. Rest of the sample surface—area with silicate glass-like layer (sample Ti 5).

In another instance, the coated product passes the "Open Flame Test" carried out in the following procedure: partially coated metal samples were flamed on the border between coated and uncoated surface with a propylene gas torch until the changes in colour were observed on the uncoated area. Preferably, the coated product passes the "Open Flame Test" without any colour changes (see FIG. 4.). Colour changes are caused by high temperature oxidation.

In another instance, the herein described coating provides excellent water-repellent properties. The wettability of the coating was determined in accordance with the "Standard Practice for Surface Wettability of Coatings, Substrates and Pigments by Advancing Contact Angle Measurement", known industry standard for example ASTM D7334-08 (2013): Standard Practice for Surface Wettability of Coatings, Substrates and Pigments by Advancing Contact Angle Measurement, American Society for Testing and Materials (ASTM International). This practice covers the measurements of the angle of contact when a drop of liquid is applied to a coated surface. The test was carried out using the following procedure: on the coated material, a drop of DI (deionised) water was applied, a photograph was taken using a microscope and the angle of contact of the drop of DI water and the coated surface was determined using a protractor. Preferably, the coated product has a high contact angle value that indicates water-repellent properties (for example at least about 45°).

The heat resistance of the disclosed metal products is excellent. The heat resistance of the metal product is limited by the sensitivity of the underlying metal and not the glass-like layer. Metal products can be held in an oven at 370° C. for over eight hours. Therefore, in one embodiment, the metal product can have an extended heat resistance of up to about 350° C., up to about 500° C., up to about 700° C., or up to about the melting point of the metal substrate.

The metal product of the current disclosure also provides advantages beyond high temperature resistance. For example, many metals have inherent corrosion resistance or hardness, e.g. stainless steel, titanium, and other metals as disclosed herein. Coating these metal surfaces yields other improved properties. For example, the overall appearance of a metal surface will degrade under standard environmental conditions when pollutants, e.g. soot, grime, etc., accumulate on or within the pores of a surface coating.

Residual oils from fingerprints and pollutants are problematic. Removing these contaminations by cleaning is often challenging even for relatively smooth oxide surfaces because the oils and pollutants accumulate in the microscopic pores of the metal surface. Coating these materials with the product of the current disclosure improves maintenance of these surfaces by, e.g. making cleaning easier, in part because the surface of the glass-like layer is much smoother. Metal oxides have pores on the size scale of microns, whereas the glass-like layers have pores several orders of magnitude smaller, on the order of nanometres. Such a coating could be applied to, e.g. architectural designs, sculptures, and reflective surfaces such as solar reflectors.

As demonstrated in the disclosure above and further set forth in the examples below, the disclosed glass-like layer on a metal product further provides a metal product with a surface that is smoother than metal oxide layers, has smaller pores compared to the metal oxide layer, and is also more uniform and flatter than the metal oxide layer.

Metal Products

The present invention provides a product comprising a metal or metal alloy having a coating made according to a method described herein. Accordingly, the invention provides a coated metal or metal alloy product that is obtained or obtainable by a method described herein. The coated metal or metal alloy product may be a component part of a complex product.

The product according to this invention may be used in interior/exterior applications such as architectural fixtures, automobile parts, aerospace parts, marine components, bicycle components, motorbike parts, heavy transport vehicle parts (including trucks, trains, and rails), military-related components, mirrors, streetscape components (e.g. street lights and exterior signs), furniture, appliances (e.g. refrigerators, washing machines, clothing dryers, dishwashers, ranges, tabletop appliances (e.g. mixers, blenders, toasters, rice makers)), solar power components (e.g. reflectors, and collectors), consumer products and related parts (e.g. cell phones, and computer components), heat exchanges, medical instruments and tools, and/or oil and gas production components (e.g. coil tubing); wherein the substrate is generally considered the fixture or part and the oxide layer and silicate glass coat the fixture or part.

Architectural fixtures and parts include material for or items selected from window frames, window trims, doors, claddings, mirrors, reflectors, lamp housings, hinges, handles, furniture parts including tables or chair legs, seats or tops, brackets, tracks, railings, and/or hardware. Automobile parts include members of vehicle bodies and/or vehicle wheels; including, for example, roof racks/rails, window trims, waste finishers, step/side bars/running boards, door trims, lamp trims, door handles, exhaust manifolds, reflectors, fuel cap flaps, spoilers, pillar covers, door handle anti-scratch plates, antennas, brandings/emblems, window visors, speaker trims, hub caps, wheel rims, lug nuts, engine parts (e.g. pistons, blocks, shafts, cams, pulleys, housings, and covers), and/or exhaust parts (e.g. exhaust tubing/piping, mufflers, converter covers, clamps, hangers, and tail pipes). Aerospace parts include, for example, engine covers, panels, spinners, propellers, wings, flaps, elevators, and cowlings. Marine components include, for example, hulls, masts, booms, pulleys, winches, tillers, spreaders, grab rails, turnbuckles, stanchions, hatch trims, and/or trailers. Bicycle components include, for example, frames, posts, tubes, handle bars, rims, levers, gears, and/or hubs. Motorbike parts include, for example, wheels, suspension tubes, swinging arms, engine parts, exhaust parts, and trims.

There is also provided a method of preparing a coated article comprising applying (or attaching or affixing) a coated metal or metal alloy product to said article. Such a method may comprise providing a component of an article that comprises a metal or metal alloy coated according to a method described herein, and applying (or attaching or affixing) the coated component to the article, or incorporating such coated component into the article. The article may be considered an article comprising a coated component. The component can be coated according to a method described herein either before or after applying (or attaching or affixing) the component to the article.

There is also provided a method of coating a product that comprises a metal or metal alloy component, wherein the metal or metal alloy component of the product is coated according to a method described herein.

Coated products obtained by such methods are also provided.

The preferred features for the second and subsequent aspects of the invention are as provided for the first aspect of the invention mutatis mutandis.

EXAMPLES

By way of example and not limitation, test samples, prepared as follows, are illustrative of various embodiments of the present disclosure and further illustrate experimental testing conducted. The herein described aqueous alkali metal silicate solution can be an alkali-borosilicate solution containing a mixture of sodium and lithium metal counterions.

Borates can be any borate compound that is soluble and stable in water. Preferably, the borate is borax, also known as sodium borate, or sodium tetraborate, typically with ten solvation molecules, i.e. the decahydrate ($Na_2B_4O_7 \cdot 10H_2O$). Other sodium tetraborate hydrates are also acceptable as well as other sources of boron that produce borate in water. While borax is the borate most commonly used, any borate compound that produces a borosilicate glass in combination with silicates is acceptable, provided that a stable aqueous solution can be formed. In one example, the aqueous silicate solution contains 13.0% $SiO_2$, 1.7% $Na_2O$, 1.2% $Li_2O$, 1.1% $B_2O_3$, and 83.0% $H_2O$ by weight, has a specific gravity of about 1.136. Prior to use, the solution was filtered through a 1.2 mm filter and was held at 20° C. The following general procedures were used to produce test samples:

Component testing was conducted on:

(A) rolled plates made of a titanium alloy containing: 99.1% Ti, 0.5% Al and 0.4% Si. The tests plates were approximately 150 mm by 75 mm, (B) cast plates made of a stainless steel, type 304L (1.4307) containing: 0.020% C, 0.40% Si, 1.55% Mn, 0.031% P, 0.002% S, 18.1% Cr, 8.1% Ni, 0.057% N, and balanced Fe. The tests plates were approximately 150 mm by 75 mm, (C) cast plates made of a stainless steel, type 316L (1.4404) containing: 0.023% C, 0.44% Si, 0.88% Mn, 0.032% P, <0.001% S, 17.0% Cr, 10% Ni, 2.03% Mo, 0.040% N, and balanced Fe. The tests plates were approximately 150 mm by 60 mm, (D) plates made of a titanium alloy containing a maximum of: 0.08% C, 0.03% N, 0.250% 0, 0.30% Fe, 0.015% H, 0.40% of other elements and balanced Ti. The test plates were approximately 150 mm by 75 mm, (E) plates made of a stainless steel, type 316L (1.4404) containing: 0.023% C, 0.44% Si, 0.88% Mn, 0.032% P, <0.001% S, 17.0% Cr, 10% Ni, 2.03% Mo, 0.040% N, and balanced Fe. The tests plates were approximately 43 mm by 43 mm, (F) plates made of a stainless steel, type 316L (1.4404) containing: 0.023% C, 0.44% Si, 0.88% Mn, 0.032% P, <0.001% S, 17.0% Cr, 10% Ni, 2.03% Mo, 0.040% N, and balanced Fe. The tests plates were approximately 83 mm by 83 mm.

Surface pre-treatment: Material was subjected to one of the following procedures:

i. mechanical polishing; or ii. abrasive blasting (blasting with sand grit); or iii. abrasive blasting (blasting with carbon steel grit); or iv. abrasive blasting (blasting with stainless steel grit).

Removal of the oxide layer: Plates were subjected to one of the following procedures to remove the existing (old) oxide layer:

(A) plate was degreased (in alkaline solution) and then pickled in a mixture of acids composed of 15% v/v of 70% nitric acid and 1.5% v/v of 60% hydrofluoric acid for 20 minutes at ambient temperature (20° C.). The pickled sample was then rinsed two times with DI water. This yielded a clean, unstained, uncontaminated metal layer carried on the metal form; or (B) removing an existing oxide layer was accomplished by abrasive blasting already undertaken in the pre-treatment step. The sample was then rinsed with DI water. This yielded a clean, unstained, uncontaminated metal layer carried on the metal form.

Passivation: Following removal of the oxide layer, test samples were passivated using one of the following procedures:

(A) with a passivation time of 30 minutes at ambient temperature (20° C.) in 22.5% v/v of 70% nitric acid; or (B) with a passivation time of 30 minutes at ambient temperature (20° C.) in 7% w/v of citric acid; or (C) left to dry in air for 15 minutes at room temperature (20° C.).

Coating: The test samples were coated with aqueous silicate solution by immersion, spray coating, or roll coating to provide a coating thickness of about 300 nm to about 1000 nm (see FIG. 5.).

Preferably, test samples were immersed in the aqueous silicate solution for three minutes (at temperature 20° C.).

The aqueous silicate solution was the above describe alkali-borosilicate solution.

Polymerising and curing: coated test samples were subjected to elevated temperatures to polymerise and cure the silicate coatings. The temperatures can be applied by standard, convection, or IR oven. The curing times (time subjected to elevated temperatures) were three minutes in IR oven.

Test samples were subjected to the following testing: a 24 hour CASS Test, a 48 hour CASS Test, a Evaluating Coatings for High Temperature Service Test, a Measuring Adhesion by Tape Test, a Water Resistance of Coating in 100% Relative Humidity Test, a Water Resistance of Coatings Using Water Immersion Test, and the "Open Flame Test".

The "CASS (Copper Accelerated Acetic Acid Salt Spray (Fog)) Test" is a known industry standard, i.e. ASTM B368-09(2009): Standard Test Method for Copper-Accelerated Acetic Acid-Salt Spray (Fog) Testing (CASS Test), American Society for Testing and Materials (ASTM International). The "Evaluating Coatings for High Temperature Service Test" is a known industry standard, i.e. ASTM D2485-18(2018): Standard Test Methods for Evaluating Coatings For High Temperature Service, method B, American Society for Testing and Materials (ASTM International). The "Measuring Adhesion by Tape Test" is a known industry standard, e.g. ASTM D3359-09(2009): Standard Test Methods for Measuring Adhesion by Tape Test, method B, American Society for Testing and Materials (ASTM International). The "Water Resistance of Coating in 100% Relative Humidity Test" is a known industry standard, i.e. ASTM D2247-02(2002): Standard Practice for Testing Water Resistance of Coatings in 100% Relative Humidity, American Society for Testing and Materials (ASTM International). The "Water Resistance of Coatings Using Water Immersion Test" is a known industry standard, i.e. ASTM D870-02 (2002): Standard Practice for Testing Water Resistance of Coatings Using Water Immersion, American Society for Testing and Materials (ASTM International). The "Open Flame Test" comprises flaming partially coated metals samples with a propylene gas torch until changes of colour are observed in an uncoated area.

TABLE 1 below provides data on the preparation of prior art comparative samples (reference samples):

| Sample number | Sample name | Abrasive blasting grit | Removal of the oxide layer | Passivation type | Coating type |
|---|---|---|---|---|---|
| Ti 7 | 206 | Carbon steel | None | None | None |
| Ti 8 | 207 | Carbon steel | None | None | ABS[1] |
| SS 11 | 216 | Carbon steel | None | None | None |
| SS 12 | 217 | Carbon steel | None | None | ABS[1] |
| SS 13 | 1894 | Sand | None | None | None |
| SS 14 | 1898 | Sand | None | None | None |
| SS 15 | 1996 | Sand | None | None | None |

[1]Described above alkali-borosilicate solution

TABLE 2 provides data on the preparation of herein disclosed samples using the above described alkali-borosilicate solution:

| Sample number | Sample name | Abrasive blasting grit | Removal of the oxide layer | Passivation type | Coating type |
|---|---|---|---|---|---|
| Ti 1 | 203 | Stainless steel | Pickling | Drying | ABS[1] |
| Ti 2 | 204 | Stainless steel | Pickling | Nitric Acid | ABS[1] |
| Ti 3 | 205 | Stainless steel | Pickling | Citric Acid | ABS[1] |
| Ti 4 | 208 | Carbon steel | Pickling | Drying | ABS[1] |
| Ti 5 | 209 | Carbon steel | Pickling | Nitric Acid | ABS[1] |
| Ti 6 | 210 | Carbon steel | Pickling | Citric Acid | ABS[1] |
| SS 1 | 213 | Stainless steel | Pickling | Drying | ABS[1] |
| SS 2 | 214 | Stainless steel | Pickling | Nitric Acid | ABS[1] |
| SS 3 | 215 | Stainless steel | Pickling | Citric Acid | ABS[1] |
| SS 4 | 218 | Carbon steel | Pickling | Drying | ABS[1] |
| SS 5 | 219 | Carbon steel | Pickling | Nitric Acid | ABS[1] |
| SS 6 | 220 | Carbon steel | Pickling | Citric Acid | ABS[1] |
| SS 7 | 1897 | Sand | Sand-blasting | Drying | ABS[1] |
| SS 8 | 1895 | Sand | Sand-blasting | Drying | ABS[1] |
| SS 9 | 1893 | Sand | Sand-blasting | Drying | ABS[1] |
| SS 10 | 1913 | Sand | Sand-blasting | Drying | ABS[1] (Half[2]) |

[1]Described above alkali-borosilicate solution
[2]Only half of the sample was coated to perform "The Open Flame" test As shown above, samples SS 7 to SS 10 were subjected to "pre-treatment" and removal of the existing oxide layer by a single step of sand blasting.

TABLE 3 provides test results for all samples.

| Sample number | Sample name | 24 hour CASS test | 48 hour CASS test | Evaluating Coatings for High Temperature Service Test | Measuring Adhesion by Tape Test | Water Resistance of Coating in 100% Relative Humidity Test | Water Resistance of Coatings Using Water Immersion Test | "The Open Flame" Test |
|---|---|---|---|---|---|---|---|---|
| Ti 1 | 203 | P | P | P | P | P | P | P |
| Ti 2 | 204 | P | P | P | P | P | P | P |
| Ti 3 | 205 | P | P | P | P | P | P | P |
| Ti 4 | 208 | P | P | P | P | P | P | P |

TABLE 3-continued provides test results for all samples.

| Sample number | Sample name | 24 hour CASS test | 48 hour CASS test | Evaluating Coatings for High Temperature Service Test | Measuring Adhesion by Tape Test | Water Resistance of Coating in 100% Relative Humidity Test | Water Resistance of Coatings Using Water Immersion Test | "The Open Flame" Test |
|---|---|---|---|---|---|---|---|---|
| Ti 5 | 209 | P | P | P | P | P | P | P |
| Ti 6 | 210 | P | P | P | P | P | P | P |
| Ti 7 | 206 | F | F | F* | — | F* | F* | F |
| Ti 8 | 207 | F | F | F* | — | F* | F* | F |
| SS 1 | 213 | P | P | P | P | P | P | P |
| SS 2 | 214 | P | P | P | P | P | P | P |
| SS 3 | 215 | P | P | P | P | P | P | P |
| SS 4 | 218 | P | P | P | P | P | P | P |
| SS 5 | 219 | P | P | P | P | P | P | P |
| SS 6 | 220 | P | P | P | P | P | P | P |
| SS 7 | 1897 | P | — | — | — | — | — | — |
| SS 8 | 1895 | — | P | — | — | — | — | — |
| SS 9 | 1893 | — | — | — | — | — | P | — |
| SS 10** | 1913 | — | — | — | P | — | | P |
| SS 11 | 216 | F | F | F* | — | F* | F* | F |
| SS 12 | 217 | F | F | F* | — | F* | F* | F |
| SS 13 | 1894 | F | — | — | — | — | — | — |
| SS 14 | 1898 | — | F | — | — | — | — | — |
| SS 15 | 1996 | — | — | — | — | — | F | — |
| SS 10*** | 1913 | — | — | — | — | — | — | F |

Where:
"F" equates to failure,
"P(—)" equates with a minor change in appearance
"P" equates with no change in visual appearance
*the tests were conducted to evaluate the coat, however, the raw samples were assessed for comparison
**the tests were conducted the coated half
***the tests were conducted the uncoated half The test of wettability of coating was determined in accordance with the "Standard Practice for Surface Wettability of Coatings, Substrates and Pigments by Advancing Contact Angle Measurement" American Society for Testing and Materials (ASTM International) D7334-08(2013) and was performed on samples made of stainless steel.

Removal of the oxide layer: sample prepared for the test was degreased (in alkaline solution) and then pickled in a mixture of acids composed of 15% v/v of 70% nitric acid and 1.5% v/v of 60% hydrofluoric acid for 5 minutes at ambient temperature (20° C.). The pickled sample was then rinsed two times with DI water. This yielded a clean, unstained, uncontaminated metal layer carried on the metal form.

Passivation: following pickling test samples were passivated with a passivation time of 30 minutes at ambient temperature (20° C.) in 22.5% v/v of 70% nitric acid.

Figure 5:
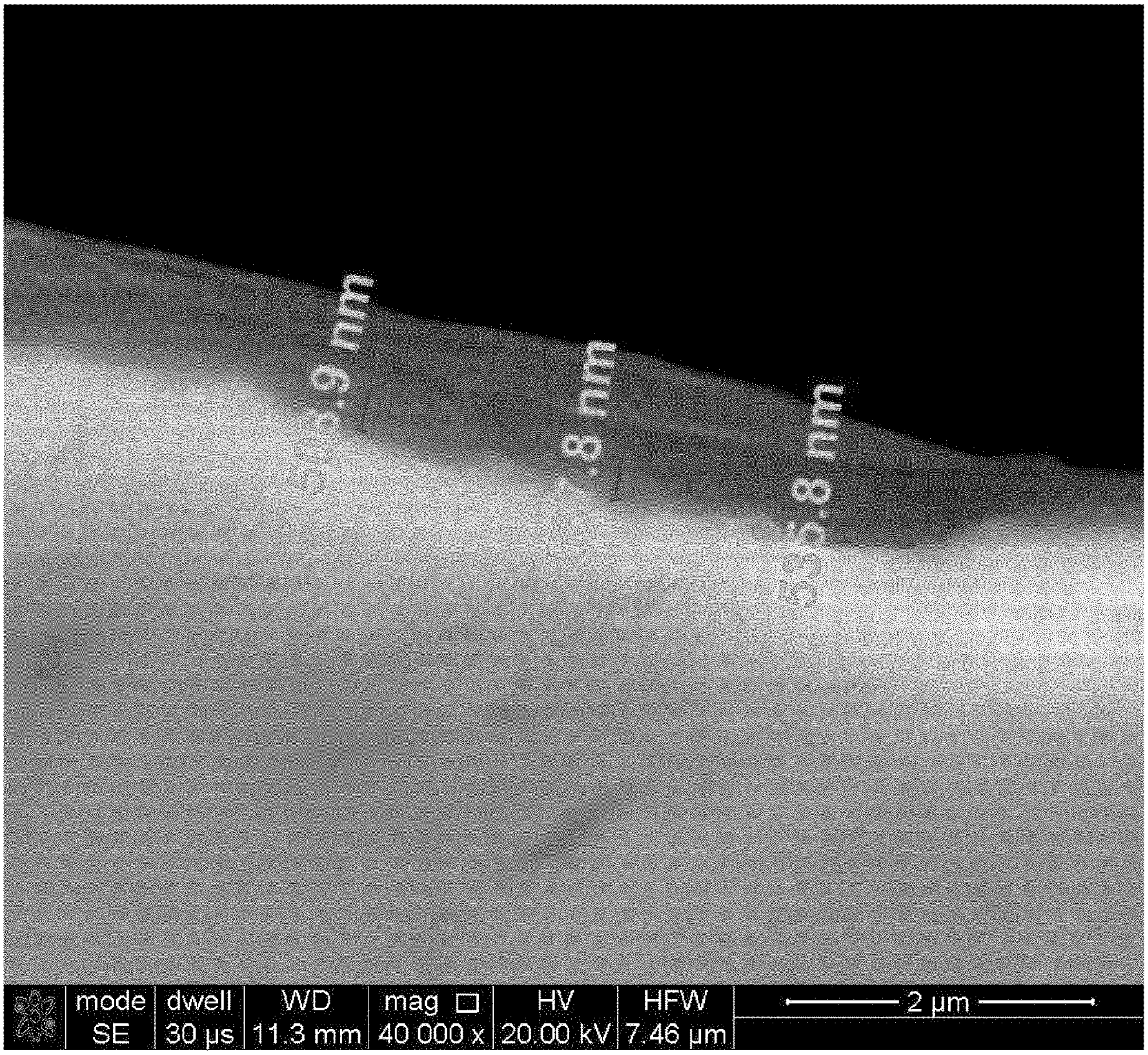
FIG. 5—SEM photomicrograph of a metal product of the current invention (sample Ti 2).

Coating: passivated test samples with removed naturally existing oxide layer were coated with aqueous silicate solution by immersion, spray coating, or roll coating to provide a coating thickness of about 300 nm to about 1000 nm (see FIG. 5.).

Preferably, test samples were immersed in the aqueous silicate solution for three minutes (at temperature 20° C.).

The aqueous silicate solution was the above describe alkali-borosilicate solution.

Polymerising and curing: coated test samples were subjected to elevated temperatures to polymerise and cure the silicate coatings. The temperatures can be applied by standard, convection, or IR oven. The curing was done by one of the following methods.

(A) exposition to elevated temperature what was achieved by placing the samples in the convection oven set to one of the following temperatures: 120° C., 200° C., 230° C., and 300° C.

(B) exposition to IR radiation for three minutes.

The wettability of coated samples was then determined in accordance with the "Standard Practice for Surface Wettability of Coatings, Substrates and Pigments by Advancing Contact Angle Measurement" ASTM D7334-08(2013). The wetting angles were then determined for all samples and have been sorted in ascending order and are represented by given equivalents, where 1—the greatest contact angle, 5—the smallest contact angle.

TABLE 4 below provides data on the preparation of prior art comparative samples (reference samples):

| Sample number | Sample name | Abrasive blasting grit | Removal of the oxide layer | Passivation type | Coating type | Curing temperature/Curing method |
|---|---|---|---|---|---|---|
| SS 16 | 1907 | none | Pickling | Nitric acid | ABS[1] | 120° C. |
| SS 17 | 1908 | none | Pickling | Nitric acid | ABS[1] | 200° C. |
| SS 18 | 1909 | none | Pickling | Nitric acid | ABS[1] | 230° C. |

TABLE 4-continued below provides data on the preparation of prior art comparative samples (reference samples):

| Sample number | Sample name | Abrasive blasting grit | Removal of the oxide layer | Passivation type | Coating type | Curing temperature/Curing method |
|---|---|---|---|---|---|---|
| SS 19 | 1911 | none | Pickling | Nitric acid | ABS[1] | 300° C. |
| SS 20 | 1912 | none | Pickling | Nitric acid | ABS[1] | IR |

[1]Described above alkali-borosilicate solution

TABLE 5 provides test results for all samples.

| Sample number | Equivalent of the contact angle (of DI water and the coated surface) |
|---|---|
| SS 16 | 5 - sample exhibits the smallest contact angle |
| SS 17 | 4 - sample exhibits a small contact angle |
| SS 18 | 3 - sample exhibits increased contact angle |
| SS 19 | 2 - sample exhibits increased contact angle |
| SS 20 | 1 - sample exhibits the largest contact angle |

Figure 6:
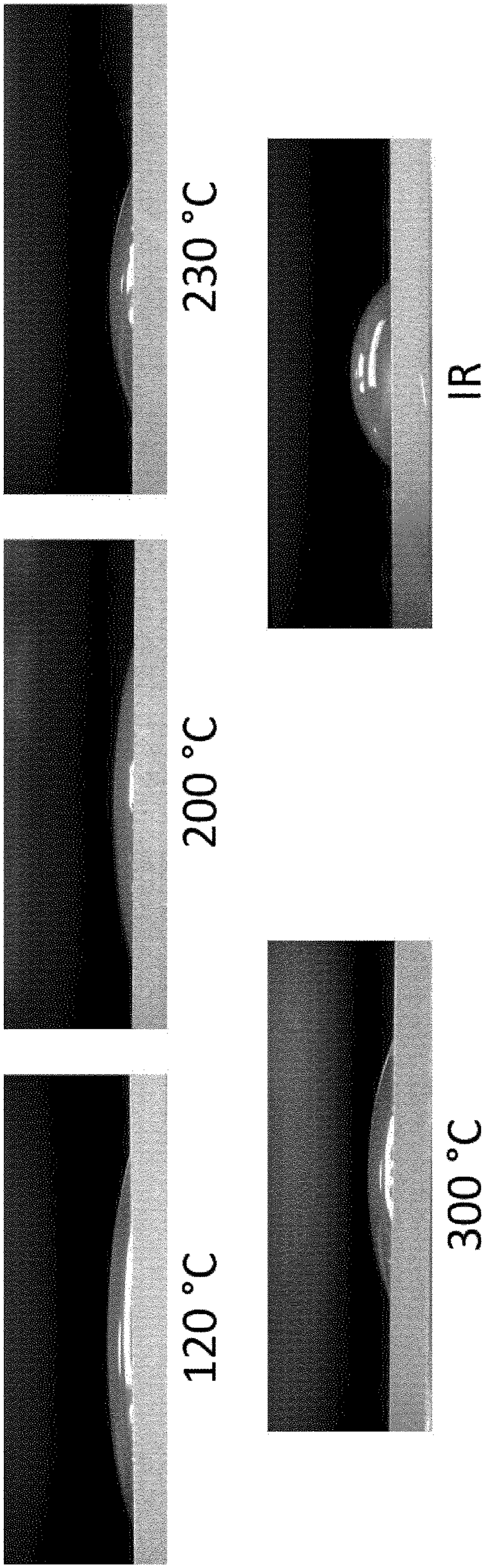
FIG. 6—A photograph of five metal plates (stainless steel) with water droplets on the surface to demonstrate differences in wettability (hydrophobicity). Upper row, from left: sample cured at 120° C. (sample SS 16), 200° C. (sample SS 17); 230° C. (sample SS 18). Lower row, from left: sample cured at 300° C. (sample SS 19); in IR oven (sample SS 20).

The difference in wettability can be also determined by visualisation, to represent that drops of DI water were placed on each sample and photography was taken to demonstrate differences (see FIG. 6.).

Although the titanium and stainless steel samples that were coated with the alkali-borosilicate solution in the absence of removal of an oxide layer and passivation may perform well, samples of laboratory grade are expected to perform well. However, in practice, any metal or metal alloy to which the present invention is to be applied would not be laboratory grade and requires the combined pickling and passivation process according to the present invention, plus the ABS coating, to provide coated metals or metal alloys with superior properties.

As demonstrated above, the method of curing can influence the hydrophobicity of the samples. Curing the coating using infra-red oven produces an final product with improved hydrophobic properties. However, curing the coating by heating can also provide a product with improved hydrophobic properties. When the coating is cured using a temperature of at least 230° C., the hydrophobic properties of the coated product are clearly improved. Increasing the curing temperature to 300° C. further increases the hydrophobicity of the product. However, it is not always necessary to cure at such high temperatures to provide coated metal products having excellent properties. For example, curing at a temperature of 200° C. still provide coated metal products with an excellent anti-corrosive coating, as demonstrated above.

The methods of the present invention provide several advantages over the methods of the prior art. As demonstrated in the above Examples, the methods of the present invention provide coated materials that are highly durable and resistant to corrosion, water, heat and air pollution. In addition, the methods of the present invention are unexpectedly able to achieve coated materials with such properties without the use of passivation by anodisation. The methods comprising forming an oxide layer by chemical passivation or exposure to a gaseous oxidising environment, such as air, provide a material having an improved, more natural, appearance, whilst still retaining the high durability and resistance to corrosion, water and heat. The use of the combination of removal of an existing oxide layer and passivation also provides a material having a smoother surface that is easier to keep clean, compared to materials that have been passivated using anodisation. The provision of coated materials that have protection against high temperature oxidation whilst keeping a natural look is a significant advantage of the present invention that is not shared by any of the methods of the prior art.

Embodiments

The invention includes at least the following embodiments:

1. A process for preparing a coated metal or metal alloy product, the process comprising:
   removing any existing oxide layer from the metal or metal alloy;
   forming a new oxide layer on the surface of the metal or metal alloy using chemical passivation and/or exposure to a gaseous oxidising environment;
   applying a coating of an aqueous silicate solution to the metal or metal alloy oxide layer; and
   curing the applied coating on the oxide layer to provide a silicate coating layer by:
   a) heating the coated, passive layer to a temperature of at least 200° C.; or
   b) exposing the coated, passive layer to an infrared source.
2. The process of embodiment 1, wherein the method comprises a step of providing a metal or metal alloy substrate comprising an existing oxide layer, and the method comprises a step of removing the existing oxide layer from the metal or metal alloy.
3. The process of embodiment 1 or embodiment 2, wherein the gaseous oxidising environment is air or other gaseous environment comprising oxygen.
4. The process of any preceding embodiment, wherein the step of exposure to a gaseous oxidising environment comprises drying.
5. The process of any preceding embodiment, wherein the coated, passive layer is heated to a temperature of at least 230° C.
6. The process of any preceding embodiment, wherein the aqueous silicate solution has a pH of from about 10 to about 13 (or from about 11 to about 13).
7. The process of any preceding embodiment, wherein the aqueous silicate solution comprises $SiO_2$, $M_2O$, and optionally $B_2O_3$, wherein M is selected from Li, Na, K, and a mixture thereof.
8. The process of embodiment 7, wherein the aqueous silicate solution has a composition that includes a ratio of $SiO_2$ to $M_2O$ of from about 3.8 to about 2.0 and, if $B_2O_3$ is present, a ratio of $SiO_2$ to $B_2O_3$ of from about 10:1 to about 200:1.

9. The process of any preceding embodiment, wherein the existing oxide layer is removed from the metal or metal alloy by pickling using an acidic pickling solution.
10. The process of embodiment 9, wherein the pickling is carried out using an acidic pickling solution by immersion in the solution or application of the solution to the surface of the metal or metal alloy, for example, by spraying.
11. The process of embodiment 9 or embodiment 10, wherein the pickling is carried out using an acidic pickling solution comprising nitric acid, hydrofluoric acid, chloric acid, sulphuric acid, phosphoric acid, sodium persulphate, hydrogen peroxide, or a combination thereof.
12. The process of any one of embodiments 9 to 11, wherein the pickling is carried out using an acidic pickling solution comprising accelerants, inhibitors, wetting agents, or proprietary solutions.
13. The process of any one of embodiments 9 to 12, wherein the pickling solution comprises nitric acid and hydrofluoric acid.
14. The process of any one of embodiments 9 to 12, wherein the pickling solution comprises hydrofluoric acid.
15. The process of any one of embodiments 9 to 14, wherein the acidic pickling solution has a pH of about 1.
16. The process of any one of embodiments 9 to 15, wherein the acidic pickling solution comprises 10%-20% v/v (150 g/L-300 g/L) of 70% nitric acid and from 1% to 2% v/v (12 g/L-24 g/L) of 60 hydrofluoric acid.
17. The process of embodiment 16, wherein the acidic pickling solution comprises 15% v/v (225 g/L) of 70% nitric acid and 1.5% v/v (18 g/L) of 60% hydrofluoric acid.
18. The process of any one of embodiments 9 to 17, wherein the acidic pickling solution has a nitric acid to hydrofluoric acid percentage ratio of 10:1.
19. The process of any one of embodiments 9 to 18 wherein the pickling is carried out for at least 1 minute.
20. The process of any one of embodiments 9 to 19 wherein the pickling is carried out at a temperature of at least 15° C.
21. The process of any one of embodiments 9 to 20, wherein the step of pickling is conducted at ambient temperature.
22. The process of any preceding embodiment, wherein the new oxide layer is formed by chemical passivation and is carried out using a passivating solution by immersion in the solution or application of the solution to the surface of the metal or metal alloy, for example, by spraying.
23. The process of any preceding embodiment, wherein the new oxide layer is formed by chemical passivation and is carried out using a passivating solution comprising nitric acid, sulphuric acid, phosphoric acid, citric acid, hydrogen peroxide, or sodium dichromate, or combinations thereof.
24. The process of embodiment 22 or embodiment 23, wherein the passivating solution comprises nitric acid or citric acid.
25. The process of embodiment 24, wherein the passivating solution comprises from about 1% to about 30% citric acid or from about 15% to about 30% v/v of 70% nitric acid.
26. The process of any one of embodiments 22 to 25, wherein the passivating solution has a pH of about 1.
27. The process of any preceding embodiment, wherein the passivation is chemical passivation and is conducted for at least 3 minutes.
28. The process of embodiment 27, wherein the chemical passivation is conducted for up to 1 hour.
29. The process of any preceding embodiment, wherein the new oxide layer is formed by chemical passivation and is conducted at a temperature of between 15° C. and 80° C.
30. The process of any preceding embodiment, wherein the new oxide layer is formed by chemical passivation and is conducted using a passivating solution comprising 15% to 30% v/v of 70% nitric acid.
31. The process of embodiment 30, wherein the step of chemical passivation is conducted for at least 20 minutes.
32. The process of embodiment 30 or embodiment 31, wherein the step of chemical passivation is conducted at a temperature of from 15° C. to 60° C.
33. The process of any one of embodiments 1 to 29, wherein the new oxide layer is formed by chemical passivation and is conducted using a passivating solution comprising 1% to 15% w/v of citric acid.
34. The process of embodiment 33, wherein the step of chemical passivation is conducted for at least 4 minutes.
35. The process of embodiment 33 or embodiment 34, wherein the step of chemical passivation is conducted at a temperature of from 15° C. to 70° C.
36. The process of any preceding embodiment, wherein the new oxide layer is formed by chemical passivation and is carried out using:
   - a) 20%-25% v/v of 70% nitric acid solution at room temperature for a minimum of 30 minutes;
   - b) 20%-25% v/v of 70% nitric acid solution heated to 45° C.-60° C. for a minimum of 20 minutes;
   - c) 4%-10% w/v citric acid solution at temperature 20° C.-50° C. for a minimum of 20 minutes;
   - d) 4%-10% w/v citric acid solution at temperature 50° C.-60° C. for a minimum of 10 minutes;
   - e) 4%-10% w/v citric acid solution at temperature 60° C.-70° C. for a minimum of 4 minutes;
   - f) 22.5% v/v of 70% nitric acid solution at ambient temperature for about 30 minutes; or
   - g) 7% w/v of citric acid solution at ambient temperature for about 30 minutes.
37. The process of any preceding embodiment, wherein the method comprises exposing the metal or metal alloy to a gaseous oxidising embodiment (e.g. air) for up to about 48 hours or up to about 24 hours from the initiation of the step of removing the oxide layer to the step of applying the coating of the aqueous silicate solution.
38. The process of any preceding embodiment, wherein the step of forming a new oxide layer on the surface of the metal or metal comprises exposing the metal or metal alloy to a gaseous oxidising environment (e.g. air) for up to about 48 hours or up to about 24 hours.
39. The process of embodiment 38, wherein the step of forming a new oxide layer on the surface of the metal or metal does not comprise chemical passivation.
40. The process of any preceding embodiment, wherein the step of forming a new oxide layer on the surface of the metal or metal comprises exposing the metal or metal alloy to a gaseous oxidising environment (e.g. air) for about 10 to about 120 minutes at a temperature of from about 15° C. to about 25° C.

41. The process of embodiment 40, wherein the step of forming a new oxide layer on the surface of the metal or metal does not comprise forming an oxide layer on the surface of the metal or metal alloy using chemical passivation.
42. The process of any preceding embodiment, wherein the step of forming a new oxide layer on the surface of the metal or metal comprises exposing the metal or metal alloy to a gaseous oxidising environment (e.g. air) for up to 48 hours at a temperature of up to about 700° C., for example, from about 25° C. to about 700° C.
43. The process of embodiment 42, wherein the step of forming a new oxide layer on the surface of the metal or metal does not comprise forming an oxide layer on the surface of the metal or metal alloy using chemical passivation.
44. The process of any preceding embodiment, wherein the gaseous oxidising environment is air or a gas environment comprising oxygen.
45. The process of any preceding embodiment, wherein the step of removing any existing oxide layer from the metal or metal alloy comprises removing the oxide layer by pickling and the step of forming a new oxide layer on the surface of the metal or metal comprises forming an oxide layer on the surface of the metal or metal alloy using chemical passivation, and the metal or metal alloy is exposed to a gaseous oxidising environment (e.g. air) for up to about 1 hour between the step of pickling and the step of chemical passivation.
46. The process of any preceding embodiment, wherein the step of forming a new oxide layer on the surface of the metal or metal comprises forming an oxide layer on the surface of the metal or metal alloy using chemical passivation, and the metal or metal alloy is exposed to air for up to 1 hour between the step of chemical passivation and the step of applying the coating of aqueous silicate solution.
47. The process of any preceding embodiment, wherein the method comprises removing an existing oxide layer by pickling and forming a new oxide layer by chemical passivation, and the method comprises exposing the metal or metal alloy to a gaseous oxidising environment (e.g. air) between the step of pickling and the step of chemical passivation for up to about 1 hour and between the step chemical passivation and the step of applying the coating of aqueous silicate solution for up to about 1 hour.
48. The process of any preceding embodiment, wherein the step of removing an existing oxide layer comprises an abrasive treatment of the surface of the metal or metal alloy, for example, abrasive blasting the surface of the metal or metal alloy.
49. The process of one of embodiments 1 to 8, wherein the step of removing an existing oxide layer comprises an abrasive treatment.
50. The process of embodiment 49, wherein the abrasive treatment is abrasive blasting.
51. The process of embodiment 49 or embodiment 50, further comprising washing and/or degreasing the blasted metal or metal alloy prior to coating.
52. The process of any one of embodiments 49 to 51, wherein the method does not comprise a step of pickling.
53. The process of any one of embodiments 49 to 52, wherein the method does not comprise a step of chemical passivation.
54. The process of any one of embodiments 49 to 53, wherein the method does not comprise a step of pickling and does not comprise a step of chemical passivation.
55. The process of any one of embodiments 49 to 54, wherein the method comprises exposing the metal or metal alloy to a gaseous oxidising environment (e.g. air) for up to about 48 hours prior to the step of applying the aqueous silicate solution.
56. The process of any preceding embodiment, further comprising a step of cleaning the metal or metal alloy prior to removing an existing oxide layer.
57. The process of embodiment 56, wherein the step of cleaning the surface of the metal comprises removing any grease from the surface of the metal or metal alloy.
58. The process of embodiment 56 or embodiment 57, wherein the step of cleaning the surface of the material comprises an abrasive treatment of the surface of the metal or metal alloy.
59. The process of embodiment 58, wherein the abrasive treatment is abrasive blasting, for example sand blasting.
60. The process of any one of embodiments 56 to 59, wherein the step of cleaning the surface of the surface of the material comprises an abrasive treatment of the surface of the metal or metal alloy, for example, abrasive blasting the surface of the metal or metal alloy, and degreasing the surface of the metal or metal alloy.
61. The process of any one of embodiments 1 to 8, comprising:
   - cleaning the surface of the metal or metal alloy, wherein the metal or metal alloy is selected from stainless steel, titanium, or titanium alloy;
   - removing an existing oxide layer from the metal or metal alloy by pickling using an acidic pickling solution comprising nitric acid and hydrofluoric acid having a pH of 1;
   - forming an oxide layer on the surface of the metal or metal alloy using a chemical passivating solution comprising nitric acid or citric acid and having a pH of 1;
   - applying a coating of an aqueous silicate solution to the metal or metal alloy, wherein the aqueous silicate solution has a pH of from 10 to 13, comprises $SiO_2$, $M_2O$, and optionally $B_2O_3$, wherein M is selected from Li, Na, K, or a mixture thereof, and has a ratio of $SiO_2$ to $M_2O$ of from about 3.8 to about 2.0 and, when $B_2O_3$ is present, a ratio of $SiO_2$ to $B_2O_3$ of from about 10:1 to about 200:1; and
   - curing the silicate solution on the oxide layer to provide a silicate coating layer by:
     - heating the coated, passive layer to a temperature of at least 200° C. or at least 230° C.; or
     - exposing the coated, passive layer to an infrared source.
62. The process of any one of embodiments 1 to 8, comprising:
   - cleaning the surface of the metal or metal alloy, wherein the metal or metal alloy is selected from stainless steel, titanium, or titanium alloy;
   - removing an existing oxide layer from the metal or metal alloy by pickling using an acidic pickling solution comprising nitric acid and hydrofluoric acid having a pH of 1;

forming an oxide layer on the surface of the metal or metal alloy using a chemical passivating solution comprising nitric acid or citric acid and having a pH of 1;

applying a coating of an aqueous silicate solution to the metal or metal alloy, wherein the aqueous silicate solution has a pH of from 10 to 13, comprises $SiO_2$, $M_2O$, and $B_2O_3$, wherein M is selected from Li, Na, K, or a mixture thereof, and has a ratio of $SiO_2$ to $M_2O$ of from about 3.8 to about 2.0 and a ratio of $SiO_2$ to $B_2O_3$ of from about 10:1 to about 200:1; and curing the silicate solution on the oxide layer to provide a silicate coating layer by:

heating the coated, passive layer to a temperature of at least 200° C. or at least 230° C.; or exposing the coated, passive layer to an infrared source.

63. The process of embodiment 61 or 62, wherein the pickling solution comprises 10%-20% v/v (150 g/L-300 g/L) of 70% nitric acid and from 1% to 2% v/v (12 g/L-24 g/L) of 60% hydrofluoric acid.

64. The process of any one of embodiments 61 to 63, wherein the passivating solution comprises 15% to 30% v/v of 70% nitric acid, is conducted for at least about 20 minutes and is conducted at a temperature of from about 15° C. to about 60° C.

65. The process of one of embodiments 61 to 63, wherein the passivating solution comprises 1% to 15% w/v of citric acid, is conducted for at least about 4 minutes and is conducted at a temperature of from about 21° C. to about 70° C.

66. The process of any one of embodiments 61 to 65, comprising exposing the metal or metal alloy to a gaseous oxidising environment for up to 1 hour between the step of pickling and chemical passivation, and for up to about 1 hour between the step of chemical passivation and the step of applying the coating of aqueous silicate solution.

67. The process of any one of embodiments 61 to 65, comprising exposing the metal or metal alloy to a gaseous oxidising environment for up to 2 hours between the step of pickling and the step of applying the coating of aqueous silicate solution.

68. The process of any one of embodiments 1 to 8, comprising providing a metal or metal alloy substrate comprising an oxide layer;

removing the existing oxide layer from the metal or metal alloy by abrasive blasting;

washing the blasted metal or metal alloy;

exposing the metal or metal alloy to a gaseous oxidising environment (e.g. air) for up to 48 hours (preferably up to 24 hours) to form a new oxide layer on the surface of the metal or metal alloy.

applying a coating of an aqueous silicate solution to the new metal or metal alloy oxide layer;

curing the applied coating on the new oxide layer to provide a silicate coating layer by:

heating the coating to a temperature of at least 200° C. or at least 230° C.; or exposing the coating to an infrared source 69. The process of any one of embodiments 1 to 8, comprising providing a metal or metal alloy substrate comprising an oxide layer;

removing the existing oxide layer from the metal or metal alloy by abrasive blasting;

washing the blasted metal or metal alloy;

exposing the metal or metal alloy to a gaseous oxidising environment (e.g. air) for up to 48 hours (preferably up to 24 hours) to form a new oxide layer on the surface of the metal or metal alloy;

applying a coating of an aqueous silicate solution to the new metal or metal alloy oxide layer, wherein the aqueous silicate solution has a pH of from 10 to 13, that comprises $SiO_2$ and $M_2O$ and optionally $B_2O_3$, wherein M is selected from Li, Na, K, or a mixture thereof, and has a ratio of $SiO_2$ to $M_2O$ of from about 3.8 to about 2 and, if $B_2O_3$ is present, a ratio of $SiO_2$ to $B_2O_3$ of from about 10:1 to about 200:1;

curing the applied coating on the new oxide layer to provide a silicate coating layer by:

heating the coating to a temperature of at least 200° C. or at least 230° C.; or exposing the coating to an infrared source.

70. The process of any one of embodiments 1 to 8, comprising providing a metal or metal alloy substrate comprising an oxide layer;

removing the existing oxide layer from the metal or metal alloy by abrasive blasting;

washing the blasted metal or metal alloy;

exposing the metal or metal alloy to a gaseous oxidising environment (e.g. air) for up to 48 hours (preferably up to 24 hours) at room temperature to form a new oxide layer on the surface of the metal or metal alloy;

applying a coating of an aqueous silicate solution to the new metal or metal alloy oxide layer, wherein the aqueous silicate solution has a pH of from 10 to 13, that comprises $SiO_2$ and $M_2O$ and optionally $B_2O_3$, wherein M is selected from Li, Na, K, or a mixture thereof, and has a ratio of $SiO_2$ to $M_2O$ of from about 3.8 to about 2 and, if $B_2O_3$ is present, a ratio of $SiO_2$ to $B_2O_3$ of from about 10:1 to about 200:1;

curing the applied coating on the new oxide layer to provide a silicate coating layer by:

heating the coating to a temperature of at least 200° C. or at least 230° C.; or exposing the coating to an infrared source.

71. The process of any one of embodiments 1 to 8, comprising providing a metal or metal alloy substrate comprising an oxide layer;

completely removing the existing oxide layer from the metal or metal alloy by abrasive blasting using an abrasive agent (for example, sand);

washing the blasted metal or metal alloy to remove the abrasive agent;

exposing the metal or metal alloy to a gaseous oxidising environment (e.g. air) for up to 48 hours (preferably up to 24 hours) at room temperature to form a new oxide layer on the surface of the metal or metal alloy, wherein the time period of up to 48 hours (preferably up to 24 hours) begins on initiation of the step of abrasive blasting;

applying a coating of an aqueous silicate solution to the new metal or metal alloy oxide layer, wherein the aqueous silicate solution has a pH of from 10 to 13, that comprises $SiO_2$ and $M_2O$ and optionally $B_2O_3$, wherein M is selected from Li, Na, K, or a mixture thereof, and has a ratio of $SiO_2$ to $M_2O$ of from about 3.8 to about 2 and, if $B_2O_3$ is present, a ratio of $SiO_2$ to $B_2O_3$ of from about 10:1 to about 200:1;

curing the applied coating on the new oxide layer to provide a silicate coating layer by:

heating the coating to a temperature of at least 200° C. or at least 230° C.; or exposing the coating to an infrared source 72. The process of any preceding embodiment, wherein the cured silicate coating layer has a thickness of less than 5 μm.

73. The process of any preceding embodiment, wherein the cured silicate coating layer has a thickness of from about 10 nm to about 5000 nm.

74. The process of any preceding embodiment, wherein the coated oxide layer prepared by chemical passivation or exposure to a gaseous oxidising environment has a thickness of less than about 50 μm.

75. The process of any preceding embodiment, wherein the coated oxide layer prepared by chemical passivation or exposure to a gaseous oxidising environment has a thickness of from about 1 nm to about 25 μm.

76. The process of any preceding embodiment, wherein the cured silicate coating layer has a thickness of less than 5 μm and the oxide layer has a thickness of less than 10 μm.

77. The process of any preceding embodiment, wherein the cured silicate coating layer has a thickness of less than 550 nm and the oxide layer has a thickness of less than 2 μm 78. The process of any preceding embodiment, wherein the metal or metal alloy is selected from the group consisting of zinc, manganese, magnesium, aluminium, titanium, iron, chromium, nickel, lead, stainless steel, copper, molybdenum, tin, niobium, or combinations or alloys thereof.

79. The process of embodiment 78, wherein the metal or metal alloy is selected from stainless steel, titanium or a titanium alloy.

80. The process of any preceding embodiment, further comprising sealing the unsealed oxide layer after the chemical passivation step to provide a sealed, passive layer.

81. The process of embodiment 80, further comprising a sealing time of less than 6 min/μm and at least 5 min/μ, 4 min/μ, 3 min/μ, 2 min/μ, 1 min/μ, 30 s/μm, or 10 s/μm; wherein forming the sealed, passive layer from the unsealed layer consists of the hot sealing process.

82. The process of any one of embodiments 80 to 82, further comprising holding the sealed, passive layer in a wet atmosphere, in water, or coated with water; and then forming the coated, passive layer by applying the aqueous silicate solution.

83. The process of any preceding embodiment, wherein the metal or metal alloy is exposed to air for a maximum of up to 48 hours between the initiation of the step of removing an existing oxide layer or, if such a step is present, the initiation of the cleaning step, and the step of applying the aqueous silicate solution.

84. The process of any preceding embodiment, wherein the metal or metal alloy is exposed to air for a maximum of up to 24 hours between the initiation of the step of removing an existing oxide layer or, if such a step is present, the initiation of the cleaning step, and the step of applying the aqueous silicate solution.

85. A process for coating a metal or metal alloy product, comprising:

a. providing a pickled metal, wherein the metal has been subjected to a method comprising:

i. optionally cleaning the surface of the metal or metal alloy;

ii. removing an existing oxide layer from the metal or metal alloy by pickling; and b. forming an oxide layer on the surface of the metal or metal alloy using chemical passivation and/or exposure to a gaseous oxidising environment;

c. applying a coating of an aqueous silicate solution to the metal or metal alloy oxide layer; and d. curing the applied coating on the oxide layer to provide a silicate coating layer by:

i. heating the coated, passive layer to a temperature of at least 200° C. or at least 230° C.; or ii. exposing the coated, passive layer to an infrared source.

86. A process for coating a metal or metal alloy product, comprising:

a. providing a metal or metal alloy that has been subjected to abrasive blasting to remove an oxide layer;

b. forming a new oxide layer on the surface of the metal or metal alloy using chemical passivation and/or exposure to a gaseous oxidising environment;

c. applying a coating of an aqueous silicate solution to the new metal or metal alloy oxide layer; and d. curing the applied coating on the oxide layer to provide a silicate coating layer by:

i. heating the coated, passive layer to a temperature of at least 200° C. or at least 230° C.; or ii. exposing the coated, passive layer to an infrared source.

87. A process for coating a metal or metal alloy product, comprising:

a. providing a metal or metal alloy that has been subjected to abrasive blasting to remove an oxide layer;

b. forming a new oxide layer on the surface of the metal or metal alloy exposure to air for up to about 48 hours;

c. applying a coating of an aqueous silicate solution to the new metal or metal alloy oxide layer; and d. curing the applied coating on the oxide layer to provide a silicate coating layer by:

i. heating the coated, passive layer to a temperature of at least 200° C. or at least 230° C.; or ii. exposing the coated, passive layer to an infrared source.

88. The process of embodiment 87, wherein the method comprises forming a new oxide layer on the surface of the metal or metal alloy exposure to air for up to about 24 hours.

89. A process for coating a metal or metal alloy product, comprising:

a. providing a pickled and passivated metal, wherein the metal has been subjected to a method comprising:

i. optionally cleaning the surface of the metal or metal alloy;

ii. removing an existing oxide layer from the metal or metal alloy by pickling; and iii. forming an oxide layer on the surface of the metal or metal alloy using chemical passivation and/or exposure to a gaseous oxidising environment;

b. applying a coating of an aqueous silicate solution to the metal or metal alloy oxide layer; and c. curing the applied coating on the oxide layer to provide a silicate coating layer by:

i. heating the coating to a temperature of at least 200° C. or at least 230° C.; or ii. exposing the coating to an infrared source.

90. A process for coating a metal or metal alloy product, comprising:

a. providing a metal or metal alloy that has been subjected to abrasive blasting and which comprises a natural passivated oxide layer formed by exposure to a gaseous oxidising environment (for example, air) for a period of up to 48 hours:

b. applying a coating of an aqueous silicate solution to the metal or metal comprising the oxide layer; and c. curing the applied coating on the oxide layer to provide a silicate coating layer by:

i. heating coating to a temperature of at least 200° C. or at least 230° C.; or ii. exposing coating layer to an infrared source.

91. The process of embodiment 90, wherein the provided metal or metal alloy has been subjected to abrasive blasting and comprises a natural passivated oxide layer formed by exposure to a gaseous oxidising environment (for example, air) for a period of up to 24 hours.

92. A metal product comprising a coating obtained or obtainable according to any one of embodiments 1 to 91.

93. A method of preparing a coated article comprising applying a coated metal or metal alloy product prepared according to a method of any one of embodiments 1 to 91 to said article.

It should be understood that various changes and modifications to the presently preferred embodiments described herein will be apparent to those skilled in the art. Such changes and modifications can be made without departing from the spirit and scope of the present subject matter and without diminishing its intended advantages. It is, therefore, intended that such changes and modifications be covered by the appended claims.

The invention claimed is:

1. A process for preparing a coated metal or metal alloy product, the process comprising:

providing a metal substrate selected from aluminum, an aluminum alloy, titanium, a titanium alloy, or stainless steel;

removing an existing oxide layer from the metal substrate by pickling;

forming a new oxide layer on the surface of the metal substrate by contacting the metal substrate with a passivating solution comprising an acid selected from the group consisting of nitric acid, sulfuric acid, phosphoric acid, citric acid, hydrogen peroxide, sodium dichromate, or any combination thereof, and/or exposing the metal substrate to a gaseous oxidizing environment for a period of time of up to 48 hours;

applying a coating of an aqueous silicate solution to the metal substrate oxide layer; and curing the applied coating on the oxide layer to provide a silicate coating layer by:

a) heating the coated, passive layer to a temperature of at least 200° C.; or b) exposing the coated, passive layer to an infrared source, wherein the existing oxide layer is removed from the metal substrate by pickling using an acidic pickling solution comprising 10%-20% v/v (150 g/L-300 g/L) of 70% nitric acid and from 1% to 2% v/v (12 g/L-24 g/L) of 60% hydrofluoric acid.

2. The process of claim 1, wherein the aqueous silicate solution comprises $SiO_2$, $M_2O$, and optionally $B_2O_3$, wherein M is selected from Li, Na, K, and a mixture thereof.

3. The process of claim 1, wherein the existing oxide layer is removed by abrasive blasting and the new oxide layer is formed by exposing the metal substrate to air for up to about 48 hours.

4. The process of claim 3, wherein the new oxide layer is formed by exposing the metal substrate to air for up to about 24 hours.

5. The process of claim 3, further comprising a step of washing the metal substrate prior to applying the coating of aqueous silicate solution.

6. The process of claim 1, wherein the acidic pickling solution comprises 15% v/v (225 g/L) of 70% nitric acid and 1.5% v/v (18 g/L) of 60% hydrofluoric acid.

7. The process of claim 1, wherein the acidic pickling solution has a nitric acid to hydrofluoric acid percentage ratio of 10:1.

8. The process of claim 1 wherein the pickling is carried out for at least 1 minute at a temperature of at least 15° C.

9. The process of claim 1, wherein the passivating solution comprises from about 1% to about 30% citric acid or from about 15% to about 30% v/v of 70% nitric acid.

10. The process of claim 9, wherein the passivation is conducted for at least 3 minutes at a temperature of between 15° C. and 80° C.

11. The process of claim 1, wherein the passivating solution comprises from 15% to 30% v/v of 70% nitric acid, and wherein the step of chemical passivation is conducted for at least 20 minutes at a temperature of from 15° C. to 60° C.

12. The process of claim 1, wherein the passivating solution comprises from 1% to 15% w/v of citric acid, and wherein the step of chemical passivation is conducted for at least 4 minutes at a temperature of from 15° C. to 70° C.

13. The process of claim 1, wherein passivation is carried out using:

a) 20%-25% v/v of 70% nitric acid solution at room temperature for a minimum of 30 minutes;

b) 20%-25% v/v of 70% nitric acid solution heated to 45° C.-60° C. for a minimum of 20 minutes;

c) 4%-1% w/v citric acid solution at temperature 20° C.-50° C. for a minimum of 20 minutes;

d) 4%-10% w/v citric acid solution at temperature 50° C.-60° C. for a minimum of 10 minutes;

e) 4%-10% w/v citric acid solution at temperature 60° C.-70° C. for a minimum of 4 minutes;

f) 22.5% v/v of 70% nitric acid solution at ambient temperature for about 30 minutes; or g) 7% w/v of citric acid solution at ambient temperature for about 30 minutes.

14. The process of claim 1, wherein the step of forming a new oxide layer on the surface of the metal substrate comprises exposing the metal substrate to a gaseous oxidizing environment for about 10 to about 120 minutes at a temperature of from about 15° C. to about 25° C.

15. The process of claim 1, further comprising:

cleaning the surface of the metal substrate before removing the existing oxide layer;

wherein forming the oxide layer on the surface of the metal substrate comprises using a chemical passivating solution comprising nitric acid or citric acid and having a pH of about 1; and wherein the aqueous silicate solution has a pH of from about 10 to about 13, comprises $SiO_2$, $M_2O$, and $B_2O_3$, wherein M is selected from Li, Na, K, or a mixture thereof, and has a ratio of $SiO_2$ to $M_2O$ of from about 3.8 to about 2.0 and a ratio of $SiO_2$ to $B_2O_3$ of from about 10:1 to about 200:1.

16. The process of claim 1, wherein the method comprises heating the coated, passive layer to a temperature of at least 230° C.

17. The process of claim 15, wherein the passivating solution comprises 15% to 30% v/v of 70% nitric acid, and passivation is conducted for at least about 20 minutes and at a temperature of from about 15° C. to about 60° C.

18. The process of claim 15, wherein the passivating solution comprises 1% to 15% w/v of citric acid, and passivation is conducted for at least about 4 minutes and at a temperature of from about 21° C. to about 70° C.

19. The process of claim 1, wherein the cured silicate coating layer has a thickness of less than 5 μm and/or the coated oxide layer prepared by the passivation has a thickness of less than about 50 μm.

20. The process of claim 1, wherein the method comprises a step of cleaning the surface of the metal substrate prior to removing an existing oxide layer, and the step of cleaning comprises removing any grease from the surface of the metal substrate.

21. The process of claim 1, wherein the method comprises a step of cleaning the surface of the metal substrate, and the step of cleaning comprises an abrasive treatment of the surface of the metal substrate.

* * * * *